US012792775B1

(12) United States Patent
Huang et al.

(10) Patent No.: US 12,792,775 B1
(45) Date of Patent: Nov. 10, 2026

(54) DETECTION OF SENSITIVE DATA IN DOCUMENTS

(71) Applicant: DocuSign, Inc., San Francisco, CA (US)

(72) Inventors: Yangcheng Huang, Dublin (IE); Souleiman Hasan, Dublin (IE); Sean Mahon, Dublin (IE); Yan He, Seattle, WA (US); Nghia Pham, Dublin (IE); Alberto Bellini, Dublin (IE); Shaheen Umer, Menlo Park, CA (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/776,524

(22) Filed: Jul. 18, 2024

(51) Int. Cl.
*G06F 21/62* (2013.01)
*G06V 30/413* (2022.01)

(52) U.S. Cl.
CPC ........ *G06F 21/6254* (2013.01); *G06V 30/413* (2022.01)

(58) Field of Classification Search
CPC .......................... G06F 21/6254; G06V 30/413
See application file for complete search history.

(56) References Cited

U.S. PATENT DOCUMENTS

| | | | |
|---|---|---|---|
| 6,684,202 | B1 | 1/2004 | Humphrey |
| 8,577,671 | B1 | 11/2013 | Barve |
| 9,558,265 | B1 | 1/2017 | Tacchi |
| 9,634,975 | B2 | 4/2017 | McCabe |
| 9,767,186 | B2 | 9/2017 | Bhandari |
| 9,787,705 | B1 | 10/2017 | Love |
| 9,881,082 | B2 | 1/2018 | Krishnamurthy |
| 10,430,570 | B2 | 10/2019 | Gonser |
| 10,552,539 | B2 | 2/2020 | Bachmann |
| 10,832,656 | B1 | 11/2020 | Shaya |
| 10,956,683 | B2 | 3/2021 | Sapugay |
| 11,138,249 | B1 | 10/2021 | Tosik |
| 11,157,475 | B1 | 10/2021 | Cobb |
| 11,182,540 | B2 | 11/2021 | Satterfield |

(Continued)

OTHER PUBLICATIONS

Baralis E. , "Highlighter: Automatic Highlighting of Electronic Learning Documents," in IEEE Transactions on Emerging Topics in Computing, vol. 6, No. 1, pp. 7-19, 1 Jan.-Mar. 2018, doi: 10.1109/TETC2017.2681655. (Year: 2018).

(Continued)

*Primary Examiner* — Stephen T Gundry
(74) *Attorney, Agent, or Firm* — KDW FIRM PLLC

(57) ABSTRACT

A method, a system, and a computer program product for identifying sensitive data. A plurality of machine learning models are applied to an electronic document to generate a plurality of predictions. Each prediction identifies a location in a plurality of locations of sensitive data in the document. The plurality of locations of sensitive data in the electronic document are compared. Based on the comparison, one or more overlapping and non-overlapping locations of sensitive data in the electronic document are determined. At least one location in the plurality of locations corresponding to at least one of: the overlapping locations, the non-overlapping locations, and any combinations thereof is selected. A final prediction corresponding to each selected location of the sensitive data in the electronic document is generated.

20 Claims, 22 Drawing Sheets

(56) References Cited

U.S. PATENT DOCUMENTS

| | | | | |
|---|---|---|---|---|
| 11,755,821 | B2 | 9/2023 | Bhandarkar | |
| 11,809,980 | B1 * | 11/2023 | Radhakrishnan | G06N 3/045 |
| 12,321,689 | B2 | 6/2025 | Bhandarkar | |
| 12,412,669 | B1 * | 9/2025 | Jackson | G06N 20/20 |
| 12,431,239 | B1 * | 9/2025 | Murray | G06F 16/24564 |
| 12,468,983 | B2 * | 11/2025 | Xu | G06N 3/08 |
| 2004/0059736 | A1 | 3/2004 | Willse | |
| 2004/0080532 | A1 | 4/2004 | Cragun | |
| 2005/0278325 | A1 | 12/2005 | Mihalcea | |
| 2006/0156222 | A1 | 7/2006 | Chi | |
| 2013/0185634 | A1 | 7/2013 | Fox | |
| 2014/0223284 | A1 | 8/2014 | Rankin, Jr. | |
| 2015/0095770 | A1 | 4/2015 | Mani | |
| 2016/0239668 | A1 | 8/2016 | Bellert | |
| 2017/0177180 | A1 | 6/2017 | Bachmann | |
| 2017/0286835 | A1 | 10/2017 | Ho | |
| 2017/0364586 | A1 | 12/2017 | Krishnamurthy | |
| 2019/0251182 | A1 | 8/2019 | Ray | |
| 2020/0042580 | A1 | 2/2020 | Davis | |
| 2020/0265188 | A1 | 8/2020 | Nahamoo | |
| 2020/0279108 | A1 | 9/2020 | Shorter | |
| 2020/0286463 | A1 | 9/2020 | Galitsky | |
| 2020/0356637 | A1 | 11/2020 | An | |
| 2020/0387635 | A1 | 12/2020 | Lo | |
| 2021/0133438 | A1 | 5/2021 | Florencio | |
| 2021/0192126 | A1 | 6/2021 | Gehrmann | |
| 2021/0256084 | A1 | 8/2021 | Marsh | |
| 2021/0294829 | A1 | 9/2021 | Bender | |
| 2022/0035993 | A1 | 2/2022 | Bhandarkar | |
| 2022/0391538 | A1 * | 12/2022 | Boon | H04L 9/0643 |
| 2023/0195933 | A1 | 6/2023 | Satish Padmanabhan | |
| 2023/0252190 | A1 | 8/2023 | Mossoba | |
| 2023/0367891 | A1 * | 11/2023 | Joshi | G06F 21/62 |
| 2024/0061952 | A1 * | 2/2024 | Kwok | G06F 21/6245 |
| 2024/0111893 | A1 | 4/2024 | Shelton, IV | |
| 2024/0211617 | A1 | 6/2024 | Gupta | |
| 2024/0212804 | A1 | 6/2024 | Turock | |
| 2025/0005175 | A1 | 1/2025 | Sumedrea | |
| 2025/0061224 | A1 * | 2/2025 | Poh | G06F 16/278 |
| 2025/0157243 | A1 * | 5/2025 | Mishra | G06F 40/106 |
| 2025/0209209 | A1 | 6/2025 | Todd | |
| 2025/0225440 | A1 * | 7/2025 | Yagnik | G06Q 40/06 |
| 2025/0258935 | A1 | 8/2025 | Shintani | |
| 2025/0292067 | A1 * | 9/2025 | Jack | H04L 63/0421 |
| 2025/0292076 | A1 * | 9/2025 | Campbell | G06N 20/00 |
| 2025/0299099 | A1 * | 9/2025 | Alperin | G06F 16/909 |
| 2025/0307447 | A1 * | 10/2025 | Kelsey | G06F 21/554 |
| 2025/0307531 | A1 * | 10/2025 | Schafer | G06F 40/166 |
| 2025/0315449 | A1 * | 10/2025 | Aravamudan | G06F 40/20 |
| 2025/0315484 | A1 * | 10/2025 | Sinha | G06F 16/93 |
| 2025/0315555 | A1 * | 10/2025 | Huang | G06F 16/353 |
| 2025/0315686 | A1 * | 10/2025 | Glynn | G06N 3/094 |
| 2025/0316108 | A1 * | 10/2025 | Sureka | G06V 10/235 |
| 2025/0321733 | A1 * | 10/2025 | Rahman | G06F 8/75 |
| 2025/0321857 | A1 * | 10/2025 | Jain | G06F 11/3608 |
| 2025/0322154 | A1 * | 10/2025 | Malviya | G06F 40/216 |
| 2025/0322216 | A1 * | 10/2025 | Levin | G06N 3/045 |
| 2025/0322244 | A1 * | 10/2025 | Mysore | G06F 11/3684 |
| 2025/0322245 | A1 * | 10/2025 | Rahman | G06N 3/0895 |
| 2025/0322251 | A1 * | 10/2025 | Levin | G06N 20/00 |
| 2025/0322314 | A1 * | 10/2025 | Han | G06N 20/20 |
| 2025/0328548 | A1 * | 10/2025 | Liu | G06F 16/285 |
| 2025/0329182 | A1 * | 10/2025 | Sureka | G06V 30/19093 |
| 2025/0335487 | A1 * | 10/2025 | Jackson | G06F 16/338 |
| 2025/0335621 | A1 * | 10/2025 | Schroeder | G06F 21/6218 |
| 2025/0348781 | A1 * | 11/2025 | Auchar | G06N 20/00 |

OTHER PUBLICATIONS

Erkan Gunes et al., "LexRank: Graph-based Lexical Centrality as Salience in Text Summarization," Journal of Artificial ntelligence Research, vol. 22, Dec. 1, 2004, pp. 457-479.

Kulkarni, S, "GloVeNoR—Global Vectors for Node Representations, San Jose State University, Department ofcomputer Science, Masters Projects, 722, May 2019, pp. 1-56".

U.S. Appl. No. 16/942,673, filed Jan. 24, 2022, 47 pages.

* cited by examiner

DETECTION OF SENSITIVE DATA IN DOCUMENTS

BACKGROUND

An electronic document management platform allows organizations to manage a growing collection of electronic documents, such as electronic agreements. In today's data-driven world, proliferation of unstructured datasets, particularly documents containing commercially sensitive information, poses a significant challenge. Some existing solutions include named entity recognition (NER) and natural language processing (NLP) algorithms to perform data anonymization. Solutions using NER identify and classify sensitive entities, such as, personal names, addresses, financial details, and medical information within vast datasets. NLP algorithms enhance this process by understanding the contextual nuances surrounding these entities, ensuring a more precise identification and classification. However, existing systems are not capable of identifying all sensitive data and/or their specific locations within a document, and thus, suffer from low accuracy issues. Hence, existing solutions for data anonymization often fall short in preserving data utility while ensuring confidentiality, leading to potential breaches of privacy and regulatory non-compliance.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
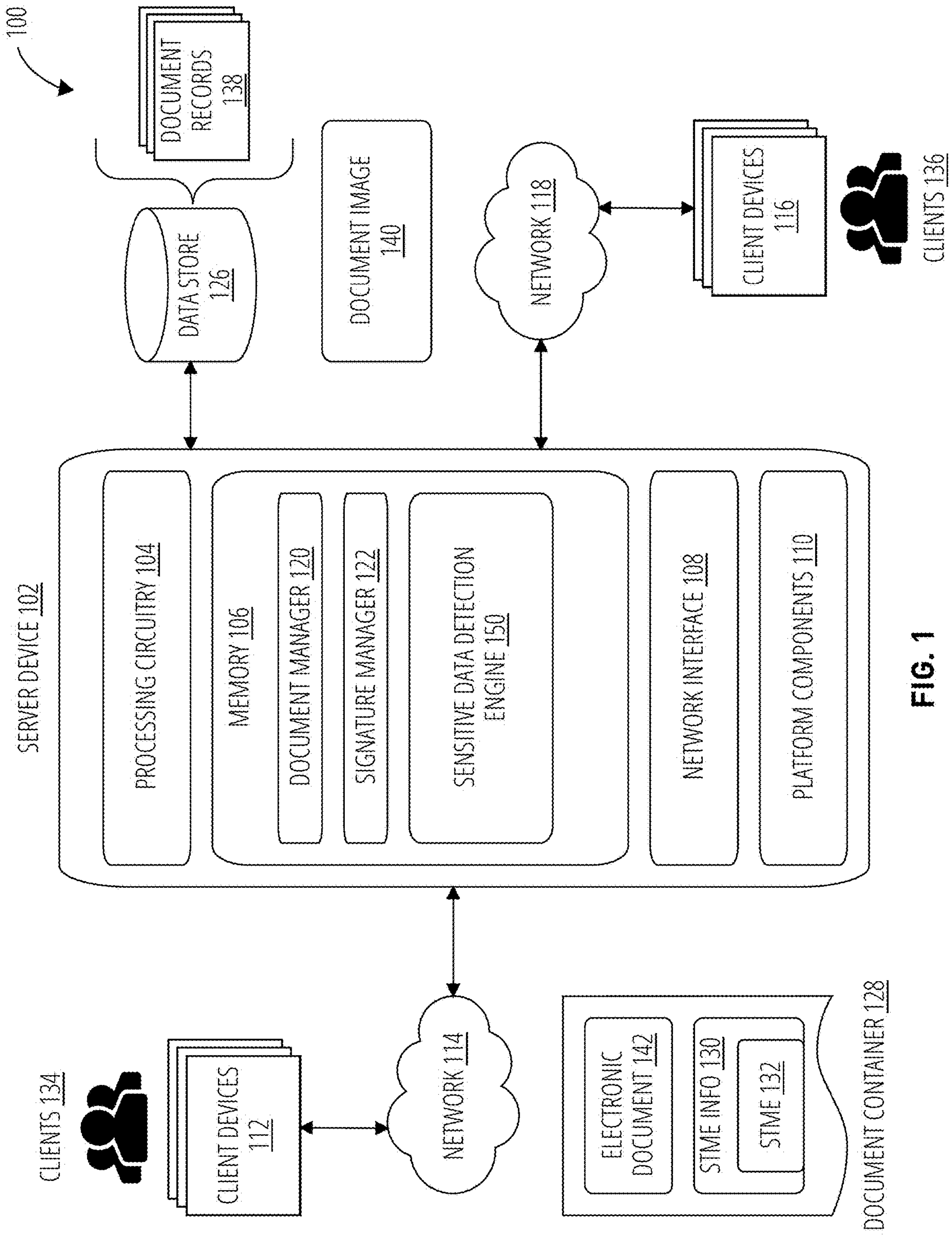
FIG. 1 illustrates a system in accordance with one embodiment.

Embodiments disclosed herein are generally directed to techniques for identification of sensitive data in one or more documents and/or document portions, where identification of such sensitive data is assisted through use of machine learning models and artificial intelligence architectures. In general, a document may include a multimedia record, which may include a single and/or multiple documents, files, media, etc. The term "electronic" may refer to technology having electrical, digital, magnetic, wireless, optical, electromagnetic, and/or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some embodiments, the current subject matter relates to identification of sensitive data or information (terms used interchangeably herewith) in datasets, including structured and/or unstructured datasets. Such datasets may include contracts, agreements, commercial documentation, trade secret data or information, nonpublic data or information, confidential data or information, secret data or information, and/or any other type of sensitive data or information and/or any combination thereof. Sensitive data or information may include data or information that an entity (e.g., a party to an agreement) may prefer to keep away from public disclosure and/or from disclosure to any unintended recipients. For instance, a trade secret (e.g., soft drink formula, trade secret manufacturing process, etc.), commercially sensitive data, and/or any other secret data may fall into the category of sensitive data or information.

To determine whether and/or where electronic document (s) have sensitive data, the current subject matter may be configured to receive electronic documents, text, images, graphics, etc. (hereinafter, "documents") and may, optionally, analyze such documents to identify documents in accordance with one or more sensitive data categories, e.g., a trade secret, commercially sensitive information, etc. The electronic documents may be represented in any desired format (e.g., .pdf, .docx, etc.). Moreover, the documents may include, for instance, text, graphics, images, tables, audio, video, computing code (e.g., source code, etc.) and/or any other type of media. Further, the documents may be any type of electronic documents, e.g., agreement types, legal document types, non-legal document types, and any combinations thereof. Further, portions of documents and/or documents (e.g., sales agreement) may be associated with other portions of and/or documents (e.g., master services agreement). One of the purposes of identifying sensitive data in electronic documents is to provide an ability of redacting sensitive data from the documents and/or replacing such data with non-sensitive data, images, etc. (e.g., a black rectangle obscuring sensitive data, etc.).

Once the documents that may include sensitive data for redaction/replacement are identified, the current subject matter may be configured to apply one or more machine learning (ML) models to identify possible locations of the sensitive data. The ML models may be of different types (e.g., machine learning models, large language models, generative AI models, etc.). The models may be configured to identify locations of sensitive data within electronic documents. Some ML models may use rules to locate such sensitive data, such as for example, regular expression model rules (e.g., a regular expression representing an email has to be in "name@domain.com" format, etc.). Other ML model(s) may be trained using set(s) of data representing sensitive data. For example, one ML model may be trained using trade secret data (e.g., recipe formula) and another ML model may be trained using documents with personal identifiable information, confidential information, etc. (e.g., example individual(s) names, addresses, etc.). As can be understood, a single ML model may be trained on different types of data representing different sensitive data. In some embodiments, the ML models may, for example, include at least one of the following: neural-network based named entity recognition models, a large language model, a generative artificial intelligence (AI) model, and any combination thereof, where the large language models, generative AI models, etc. may be part of the current subject matter system and/or be one or more third party models (e.g., GPT, Llama, Bard, Gemini, Claude, DBRX, Mixtral, etc.). One or more of such models may be trained or fine-tuned (e.g., using single prompts and/or examples) using a dataset (e.g., publicly available data from .gov, EDGAR, etc.). Each model may be configured to output a prediction of location of sensitive data within document(s). Predicted locations may then compared to determine whether any overlaps exist among models' outputs. Based on the overlaps (or lack thereof), a determination may be made whether to output either all predicted locations (e.g., where no overlaps among locations exist) or locations that overlap indicating where the sensitive data is located. The locations may then be used for the purposes of redacting, anonymizing, etc. data within the documents.

The overlapping locations may include one or more locations of the sensitive data in the electronic document that have been identified by at least two machine learning models. For example, the regular expression model may have identified the name of a person "John Smith" using a regular expression rule that defines name of a person as "first name last name" as being located in the first line of a lease agreement document. Another model, e.g., an ML model trained using a training dataset containing lease agreements (e.g., and/or any other historical dataset that may have been used for the purposes of predicting locations of sensitive data), as applied to the same lease agreement, identified that the name of a person follows the expression "Lessee" in the first line of the agreement, and/or used a wider context to identify it, etc. Yet, another model, e.g., a large language model, may have identified the name of the lessee because it has been fine-tuned using prompts and/or other training mechanisms identifying that names of lessee in lease agreements should appear in the first line of the agreement, follow the expression "Lessee", and/or can be identified using a wider context, etc. Each location identified by the above mechanisms (e.g., regular expressions, trained ML model, fine-tuned large language model, etc.) may be characterized by one or more coordinates (e.g., first page, first paragraph, second line, coordinate(s) x, coordinate(s) y, etc.). The current subject matter may then output a prediction (e.g., a final prediction) of where specific data, e.g., name of the lessee, is located in the document.

The non-overlapping locations may correspond to different locations of the sensitive data in the electronic documents that have been identified by one or more of the models. For example, given the example above, the regular expression model may identify the name of a person "John Smith" using a regular expression rule "first name last name" as being located in the first line of a lease agreement document. The trained ML model, as applied to the same lease agreement, may identify that the name of a person follows the expression "Lessee" in the second line of the agreement. The large language model may have identified the name of the lessee as being located in the third line of the agreement. In this case, because there is no overlap between predictions generated by each model, the current subject matter may output a final prediction that includes results of all three approaches.

In some embodiments, one or more filters may be applied prior to and/or subsequent to application of the models to the electronic document. The filters may be used to exclude certain categories of data from the predictions generated by each model. The categories may include data that is known to not be sensitive. For example, data that might not be considered sensitive may include, but is not limited to, date, time, product names, service names, etc. As can be understood, any other categories of unsensitive data may be used. In some embodiments, sensitive data may include, for example, but is not limited to, a personal identifiable data or information, a commercially sensitive data or information, a trade secret data or information, a secret data or information, a non-public data or information, and any combination thereof.

In some embodiments, the current subject matter may be configured to receive feedback from at least one user computing device. The feedback may be provided to the identified documents, predicted locations of sensitive data (e.g., by one or more models), overlapping and/or non-overlapping locations, and/or documents that have been identified as containing sensitive data and/or any documents/portions of documents linked to or connected with other documents containing sensitive data. Once feedback is received, the current subject matter may be configured to update identified documents, predictions of locations of sensitive data, update training of models, update training datasets, update fine-tuning of large language models, etc. Moreover, the feedback may be used to train, retrain, refresh train, etc. one or more machine learning (ML) models that may be used for the purposes of prediction of location of sensitive data in documents/portions, etc. As can be understood, the feedback may be used to perform any desired action and/or any combination of actions.

In some embodiments, the user may provide feedback (e.g., "thumbs up", "thumbs down", vote, written feedback, etc.). The feedback may be used to adjust and/or finetune, for example, how locations of sensitive data in documents are generated, how overlapping locations are predicted, how non-overlapping locations are predicted, how a final prediction is generated, etc. For example, too many thumbs down on a particular predicted location of sensitive data may mean that the way the sensitive data's location is predicted in documents may need to be adjusted to account for more important content, other documents, other locations, etc.

The current subject matter may have one or more of the following technical benefits. In particular, the sensitive information/data identification processes executed by the current subject matter enable more accurate identification of locations of all sensitive data, including data that may be linked to and/or connected with specific sensitive data. This may be accomplished through use of multiple models that predict locations of sensitive data and comparing prediction outputs to determine a final prediction of where in the electronic document, particular sensitive data may be located. Existing solutions are not capable of such multi-model predictions and hence, suffer from low accuracy. Further, the current subject matter may be configured to process structured and unstructured documents, which existing solutions are not able to do.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents (which may also be referred to as "transaction documents", "transaction packages", "document packages" or "packages") and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 21:
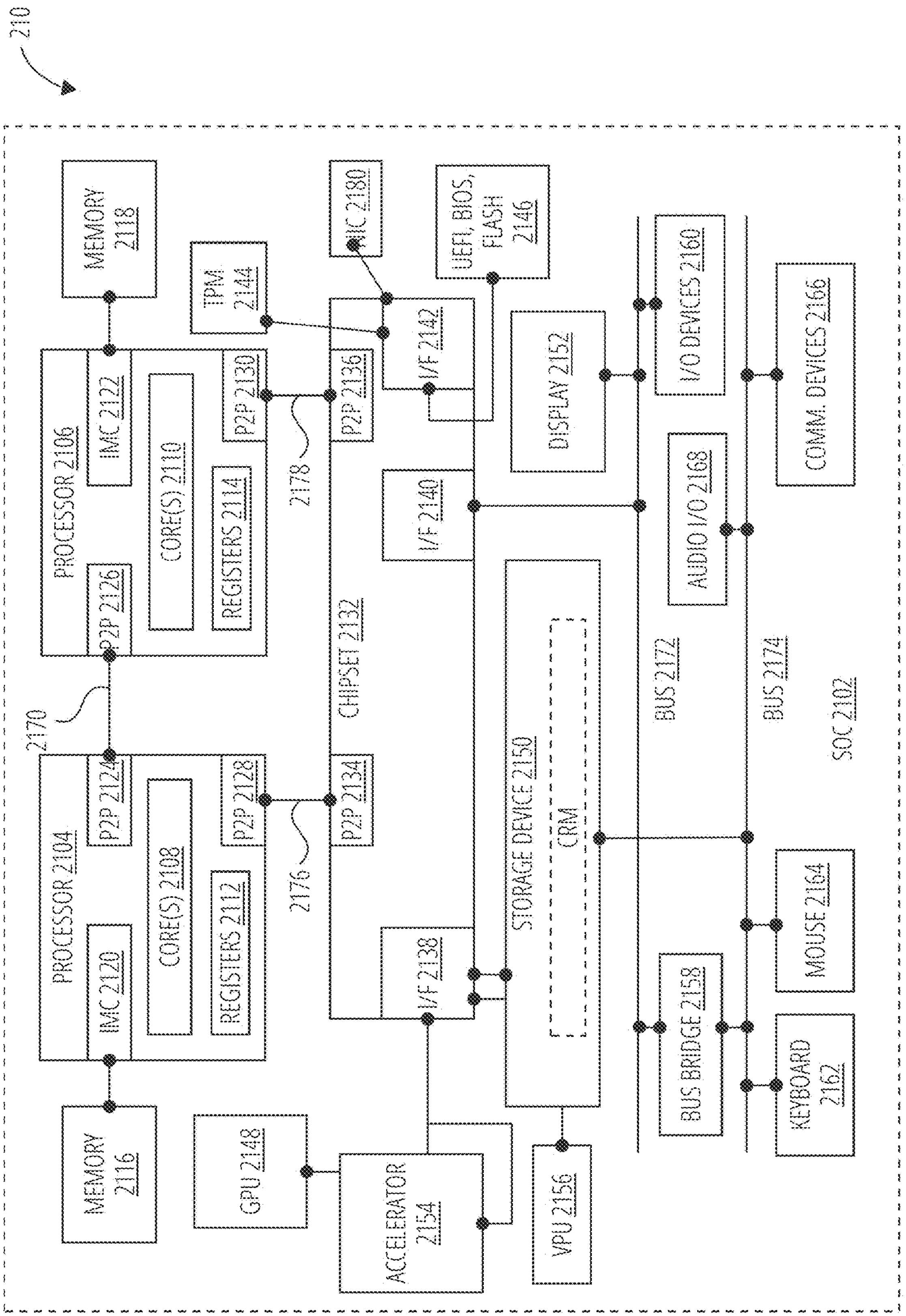
FIG. 21 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 2100 as depicted in FIG. 21.

Figure 22:
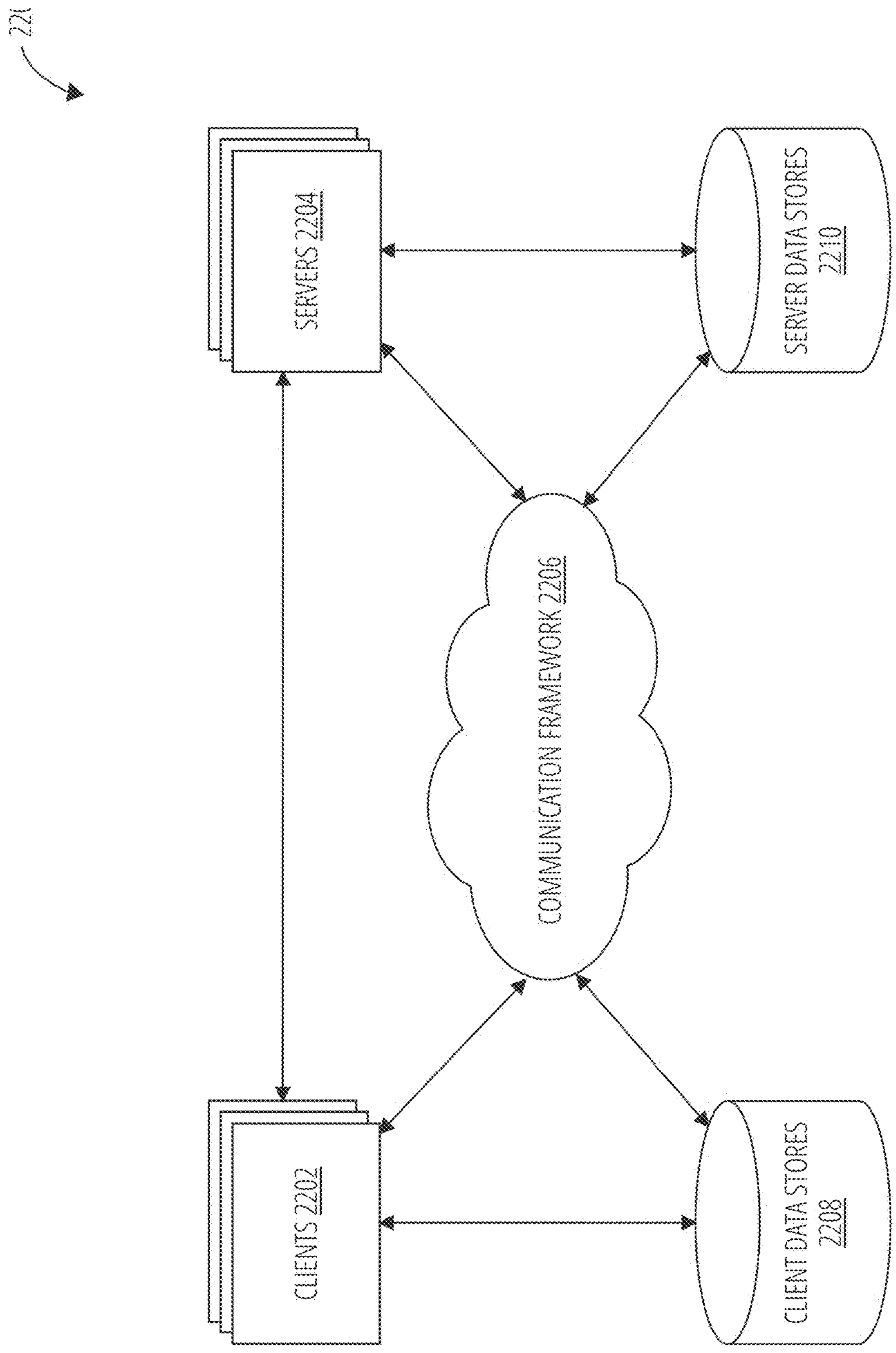
FIG. 22 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 2200 as depicted in FIG. 22.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and a sensitive data identification engine 150, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more workflows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may include one or more STME 132, which are graphical user interface (GUI) elements superimposed on the electronic document 142. The GUI elements may include textual elements, visual elements, auditory elements, tactile elements, and so forth. In some embodiments, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and workflows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140 and send the signed document image 140 to the server device 102 for verification, recordation, and storage.

Figure 7:
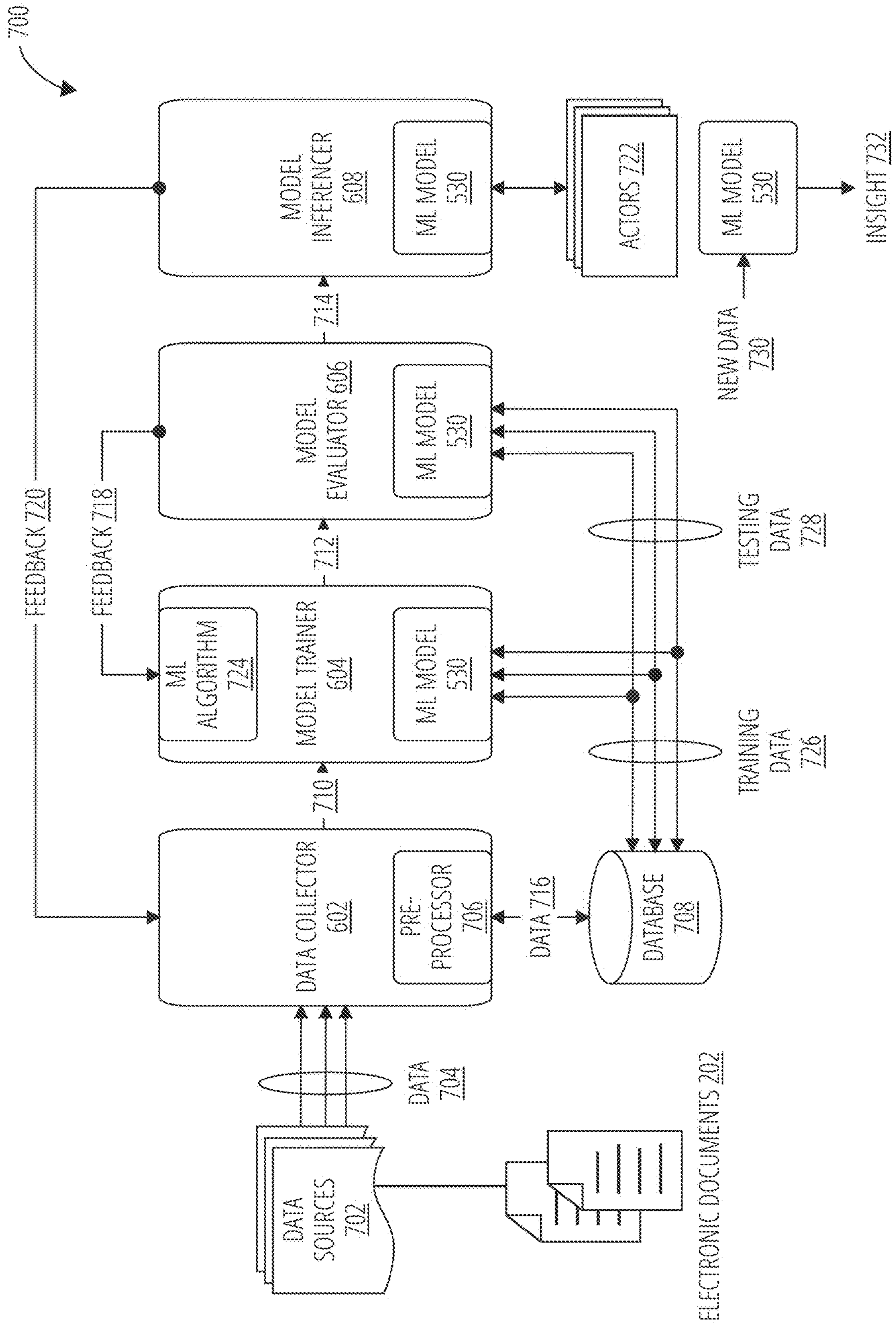
FIG. 7 illustrates an artificial intelligence architecture that may be used by the training device to generate the ML model (e.g., as shown in FIG. 2) for deployment by the inferencing device.

The engine 150 may implement and/or manage various artificial intelligence (AI) and machine learning (ML) agents to assist in various operational tasks for the EDMP of the system 100. The AI/ML agents and their operation associated with the sensitive data identification engine 150, and associated software elements, are described in more detail with reference to an artificial intelligence architecture 700 as depicted in FIG. 7. The sensitive data identification engine 150, and associated hardware elements, are described in more detail with reference to a computing architecture 2100 as depicted in FIG. 21.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

Figure 9:
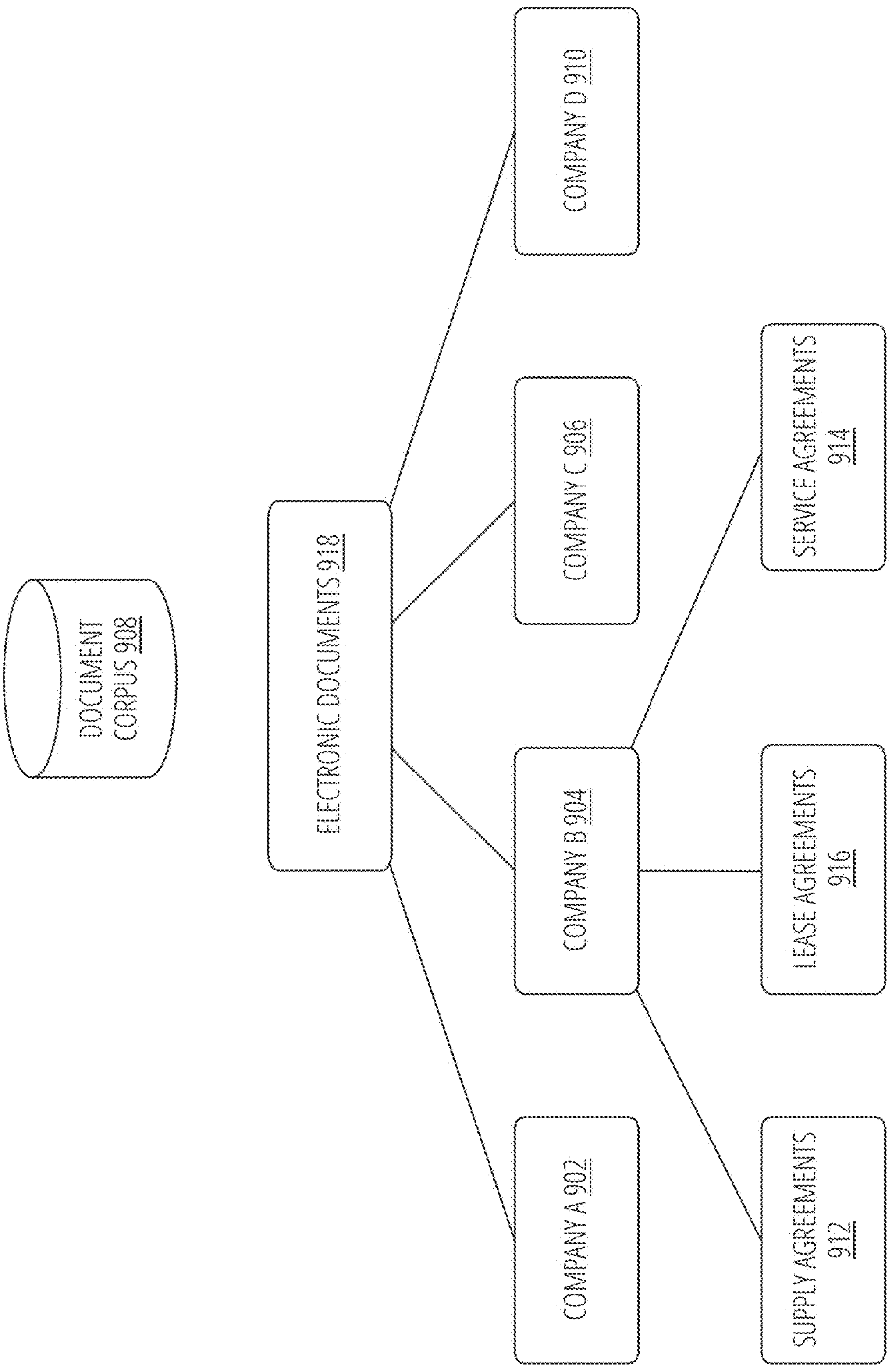
FIG. 9 illustrates a document corpus in accordance with one embodiment.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 918, as shown in FIG. 9, with tools, applications, and workflows developed by DocuSign. For example, the electronic documents 918 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more workflows developed by Adobe Systems Incorporated. The STME 132 input may be received from and generated by workflows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

In addition, as discussed above, the system 100 may include a sensitive data detection engine 150. The sensitive data detection engine 150 may implement a set of tools and/or algorithms to identify sensitive data in documents as candidates for redaction and/or replacement. The engine 150 may be configured to receive one or more electronic documents and/or portions of documents, which may include text, graphics, images, and/or any other type of media. The engine 150 may also be provided with categories of sensitive data that may need to be redacted and/or replaced within the received electronic documents, and/or alternatively, or in addition, categories of data that does not need to be identified as sensitive.

The engine 150 may then process the received electronic documents by applying one or more models, including, for example, regular expression models, trained machine learning models, fine-tuned large language models, generative AI models, etc. and/or any other types of models. Application of the models to the electronic document may be configured to generate one or more predictions of locations within the electronic document where sensitive data may be located. The predicted locations may or may not overlap. The overlapping locations may be indicative that two or more models predicted the same location within the document for a particular sensitive data. Non-overlapping locations may correspond to locations of sensitive data (which may be the same and/or same type sensitive data) within the document that may be different from one another (e.g., one model may predict that the location of sensitive data is in the first line of the first page in the document, while another model may predict that the same sensitive data is located in the third line of the first page in the document).

Once the specific predictions are generated, the sensitive data detection engine 150 may be configured to generate a final prediction of location of sensitive data within the document. The final prediction may include, for example, overlapping location, i.e., a predicted location that may be the same across different models, and/or a non-overlapping location, i.e., a predicted location that may be specific to a particular model. The sensitive data may be specific sentences, clauses, words, parties to agreements, individuals, commercial entities, formulas, equations, etc. and/or any other type of sensitive data that may be present in the document. For example, a sensitive data may be a soft drink formula; a sensitive data may be a name of an individual; etc.

In some embodiments, the engine 150 may be configured to filter out or exclude certain categories of data that may be deemed to be not sensitive, and hence, do not require redaction/removal/etc. These categories may include publicly known data, non-private data, data that is not sensitive, etc. Excluding certain categories of data may expedite generation of predictions by each model, as data belonging to such categories may be ignored when predictions are being generated by the models.

Figure 2:
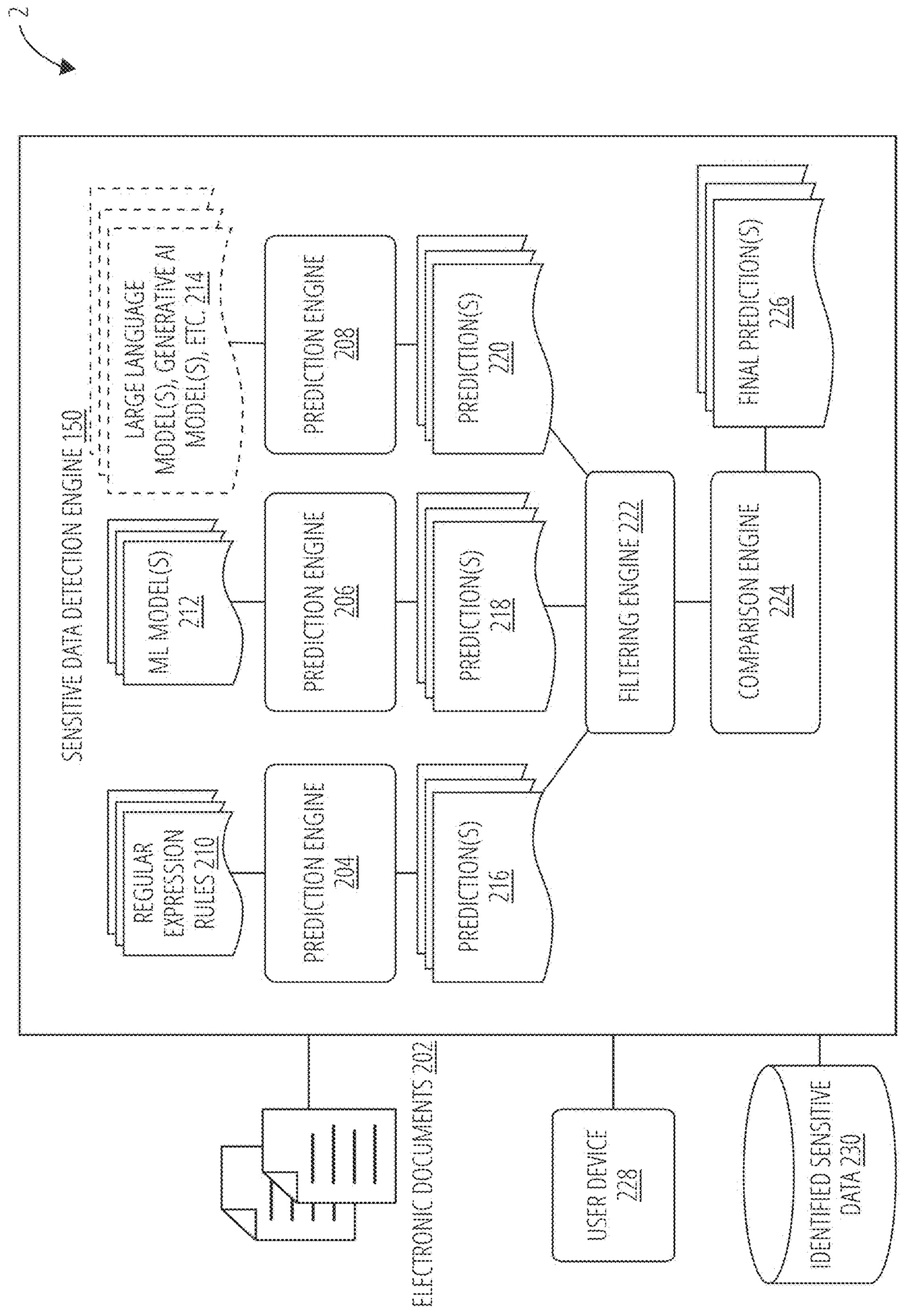
FIG. 2 illustrates an example system showing operation of the sensitive data detection engine, according to some embodiments of the current subject matter.

FIG. 2 illustrates an example system 200 showing operation of the sensitive data detection engine 150, according to some embodiments of the current subject matter. The sensitive data detection engine 150 may include one or more prediction engines 204, 206, and 208, a filtering engine 222, a comparison engine 224. The engines 204-208 may be configured to implement one or more regular expression rules 210, ML model(s) 212, and/or generative AI model(s) 214 to generate respective prediction(s) 216, 218, and 220. The sensitive data detection engine 150 may also be communicatively coupled to one or more user devices 228. In some embodiments, one or more electronic documents 202 may be received by the engine 150 for analysis and identification of locations of sensitive data for redaction and/or replacement.

One or more components of the system 200 shown in FIG. 2 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 200 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 200 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 200 may include a processor and a memory, and it is understood that the processing circuitry may contain additional components, including processors, memories, error and parity/CRC checkers, data encoders, anti-collision algorithms, controllers, command decoders, security primitives and tamperproofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some example embodiments, one or more components of the system 200 may execute one or more applications, such as software applications, that enable, for example, network communications with one or more components of system and transmit and/or receive data.

One or more components of the system 200 may include and/or be in communication with one or more servers via one or more networks and may operate as a respective front-end to back-end pair with one or more servers. One or more components of the system may transmit, for example from a mobile device application (e.g., executing on one or more user devices, components, etc.), one or more requests to one or more servers. The requests may be associated with retrieving data from servers (e.g., retrieving one or more electronic documents from one or more document storage sources that may store electronic documents 202). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 200 may include one or more networks, such as, for example, networks that may be communicatively coupling the engine 150, the document storage source (e.g., storing electronic documents 202), and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 200 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 200 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

In some embodiments, the electronic documents 202 may be stored in various data storages. For example, some data storages may be configured to be one or more private databases, access to which might not be publicly available (e.g., internal company databases, specific user access databases, etc.). The electronic documents 202 stored in these databases may be organized in a predetermined fashion, which may allow ease of access to the electronic documents and/or any portions thereof. For example, electronic documents 202 stored in these databases may be labeled, searchable, and/or otherwise, easily identifiable. The documents may be stored in a particular electronic format (e.g., PDF, .docx, etc.). The electronic documents 202 may be structured and/or unstructured.

Other data storage sources may be configured to be public non-government databases, government databases (e.g., SEC-EDGAR, etc.), etc. and may store various electronic documents, such as, for example, legal documents (e.g., commercial contracts, lease agreements, public disclosures (e.g., 10 k statements, 5 k statements, quarterly reports, etc.)), non-legal documents (e.g., articles, books, etc.). The electronic documents 202 stored in these databases may be identified using various identifiers, which may allow location of these documents in the databases, however, contents of electronic documents stored therein might not be parsed and/or specifically identified. For example, a review of the entire electronic document (e.g., 10 k statement of a company stored in SEC-EDGAR database) may need to be performed to identify a particular section (e.g., a section related to compensation of executives for the company).

In operation, one or more electronic documents 202 may be supplied to the sensitive data detection engine 150. As stated above, the documents may be any type of documents, such as, for example, agreements, applications, websites, video files, audio files, text files, images, graphics, tables, spreadsheets, computer programs, etc. The documents may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc.

In some embodiments, electronic documents 202 may include one or more pages, headings, sub-headings, sections, paragraphs, sentences, tables, images, parties, conditions, terms, specific descriptions, etc. and/or any other parts. One or more of such parts may be associated and/or assigned one or more functions (e.g., a document title, a text heading, a text paragraph, etc.). The documents 202 may be structured in a particular way (e.g., a lease agreement may include a section identifying parties, a section identifying leased premises, a section describing rent being paid, etc.). The document 202 may also be unstructured.

Upon receiving electronic documents 202, the sensitive data detection engine 150 may be configured to perform some initial processing of the documents, e.g., execute optical character recognition, determine any metadata associated with the document, and/or execute any other functions. The received documents may then be provided to one or more of the prediction engines 204, 206, and/or 208. The prediction engines 204-208 may be configured to identify one or more locations of sensitive data within the received electronic documents 202. Each engine 204-208 may be configured to use different models to perform analysis of the electronic documents to determine and/or predict where sensitive data may be located. As can be understood, engines 204-208 may be separate engines and/or a single engine using different models.

For example, prediction engine 204 may be configured to use one or more regular expression rules 210 to predict presence and/or location of sensitive data. The regular expression rules 210 may define various rules for recognition of specific sensitive data. For example, one of the regular expression rules 210 may define a rule for an email address as "name@domain.com" (and/or any other variation), another one of the regular expression rules 210 may define a rule for an individual's name "first name last name", etc. As can be understood, the rules may be defined in any desired format and/or seek to identify any type of sensitive data. The regular expression rules 210 may be stored by and/or provided to the sensitive data detection engine 150 and/or prediction engine 204. Alternatively, or in addition, the regular expression rules 210 may be obtained by the sensitive data detection engine 150 and/or prediction engine 204 from an external storage location.

Using these rules, the prediction engine 204 may analyze the received electronic documents 202 to determine presence and location of specific sensitive data that may be matching one or more of these rules. For instance, the above email rule may be used by the prediction engine 204 to analyze a lease agreement (e.g., one of the received electronic documents 202) and identify presence of an email of "john.smith@company.com" as being located in a first line of the lease agreement. In some embodiments, the location of specific sensitive data may be identified using one or more coordinates, e.g., "(x1, y1), (x2, y2)", and/or in any other fashion. The prediction engine 204 may then generate one or more prediction(s) 216 based on the identified sensitive data and its corresponding location. The prediction engine 204 may generate a prediction of specific sensitive data and its location (e.g., "john.smith@company.com" located at "(x1, y1), (x2, y2)") and/or a type of sensitive data and its location (e.g., email address located at "(x1, y1), (x2, y2)"). The format and/or content of specific prediction(s) 216 generated by prediction engine 204 may predefined in accordance with the desired output.

The prediction engine 206 may use one or more ML model(s) 212 to analyze the received electronic documents 202 to determine presence and location of specific sensitive data. The ML model(s) 212 may be trained using one or more historical documents. For example, for analysis of a lease agreement, one of the ML model(s) 212 may be trained using a set of historical lease agreements that have been previously analyzed by the sensitive data detection engine 150 (and/or prediction engine 206). Training of such ML model(s) 212 may enable the prediction engine 206 using this model to identify presence and location of sensitive data. The ML model(s) 212 may be trained using any type of data, including data stored in identified sensitive data 230. The data may be public data, private data (appropriately anonymized, if necessary), and/or any other type of data. The training data may be labeled, unlabeled, and/or have any other format. The training data may include actual data and/or labels identifying actual data, and/or both. The prediction engine 206 may be configured to identify all (and/or some of) sensitive data that may be present in the lease agreement, e.g., individual names, lease amounts, payment schedules, etc., which may have been deemed to be sensitive as a result of the training of the ML model(s) 212.

In some example, non-limiting embodiments, the ML model(s) 212 may be used by the prediction engine 206 to analyze data in specific predefined categories of sensitive data (e.g., individual names, email addresses, banking information, payment card numbers, demographics, etc.). Moreover, the ML model(s) 212 may be instructed to not identify certain categories of information as sensitive (e.g., names of products, names of services, addresses, dates, times, etc.). As can be understood, each category (either sensitive or non-sensitive data) may be defined in accordance with an analysis of a particular document. The categories may be different from one document to another (e.g., a loan agreement may include the following sensitive data categories: names, banking information, payment information, etc., and non-sensitive data categories: address, payment due date, etc.; while a lease agreement may have the following sensitive data categories: lessee's name, social security number, etc., and non-sensitive data categories: premises address, payment due date, lease term, etc.).

Similar to the output of prediction engine 204, the output, i.e., one or more prediction(s) 218, of the prediction engine 206 may include identification and/or location of sensitive data within the electronic document. Again, for instance, the location of sensitive data may be identified using one or more coordinates, e.g., "(x1, y1), (x3, y3)", character offsets, and/or in any other fashion. The predictions of engines 204 and 206 may be the same or different from one another. For instance, both engine may identify the sensitive data and/or its type but provide different predictions as the sensitive data's corresponding locations. The format and/or content of specific prediction(s) 218 generated by prediction engine 206 may likewise be predefined in accordance with the desired output.

In some embodiments, one or more large language model (s) 214 may be used by the prediction engine 208 to generate one or more prediction(s) 220 as to the presence and location of sensitive data in the received electronic documents 202. The large language model(s) 214 may be part of the engine 150 and/or be one or more third party models, including, but not limited to, any artificial intelligence generative models, e.g., GPT, Llama, Bard, Gemini, Claude, DBRX, Mixtral, etc., and may be accessed by the prediction engine 208. The large language model(s) 214 may be trained and/or fine-tuned using one or more prompts, instructions, etc., which may be specific to identification of particular sensitive data and/or specific type of electronic document. For example, the large language model(s) 214 may be trained, fine-tuned, etc. to identify emails, names, etc., which may be present in electronic documents. Alternatively, or in addition, the large language model(s) 214 may be trained, fine-tuned, etc. to identify sensitive data in lease agreements, etc. The specific instructions to the large language model(s) 214 may, for example, include: "Identify all email addresses and their locations in the document." Other example instructions may include: "Highlight sensitive data in the lease agreement and provide its location." As can be understood, any other type of instructions may be provided to the large language model(s) 214 either during training, fine tuning, etc., and/or during analysis of documents performed by the prediction engine 208.

The output of prediction engine 208 may include one or more prediction(s) 220 that may identify sensitive data and its location within the electronic document that has been presented to the generative AI model(s) 214. For example, the location of sensitive data (e.g., email address, etc.) may be identified using one or more coordinates, e.g., "(x1, y1), (x1, y2)", and/or in any other fashion. The predictions of engines 204, 206 and/or 208 may be the same or different from one another. For instance, all three engines 204-208 may identify the sensitive data and/or its type but provide different predictions as the sensitive data's corresponding locations. The format and/or content of specific prediction(s) 220 generated by prediction engine 208 may similarly be predefined in accordance with the desired output.

In some embodiments, the engines 204-208 may be directed to identify specific categories of sensitive data. These may, for instance, include trade secrets (e.g., a soft drink formula, a manufacturing process involving a trade secret formula, etc.), commercially sensitive information (e.g., confidential sales data, confidential losses data, etc.), personally identification information (PII) (e.g., name(s), address(es), etc. of individuals, parties, etc.), medical information (e.g., medical conditions, diagnoses, etc.), and/or any other secret, confidential, nonpublic, etc. data, disclosure of which may be prohibited, detrimental to various parties, etc. To identify sensitive data, the engines 204-208 may search received electronic documents 202 to determine presence of specific terms, words, phrases, sentences, paragraphs, etc., which may be considered as or be associated with specific sensitive data categories.

As discussed herein, certain categories of data may be defined as to be selected from some prediction engines but not others, and/or defined as not sensitive, and/or defined based on any other factors and thus, may be excluded from any of the prediction(s) 216, 218, and/or 220. Exclusion of categories of data may be performed at the prediction engines 204, 206, and/or 208 prior to generation of respective prediction(s) 216, 218, and/or 220, and/or by the filtering engine 222. In the latter case, the filtering engine 222 may be presented with categories of data (e.g., product names, service names, date, time, etc.) that it may need to exclude and/or filter out from the prediction(s) 216, 218, and/or 220. The filtering engine 222 may exclude same categories of data from the generated predictions across all predictions, and/or may exclude different categories of data from specific generated predictions.

A single document may be associated with different types of sensitive data. For example, a sales summary document may include sales figures and a list of customers that bought goods/services reflected by the sales figures, both of which may be identified as sensitive data (e.g., commercially sensitive data and names of parties). Alternatively, or in addition, multiple documents may be associated with a single sensitive data. For instance, one document may describe a trade secret soft drink formula and another document may describe a manufacturing process involving the formula, where both of which may be referring to the formula, which as has been previously identified as sensitive data.

Figure 16:
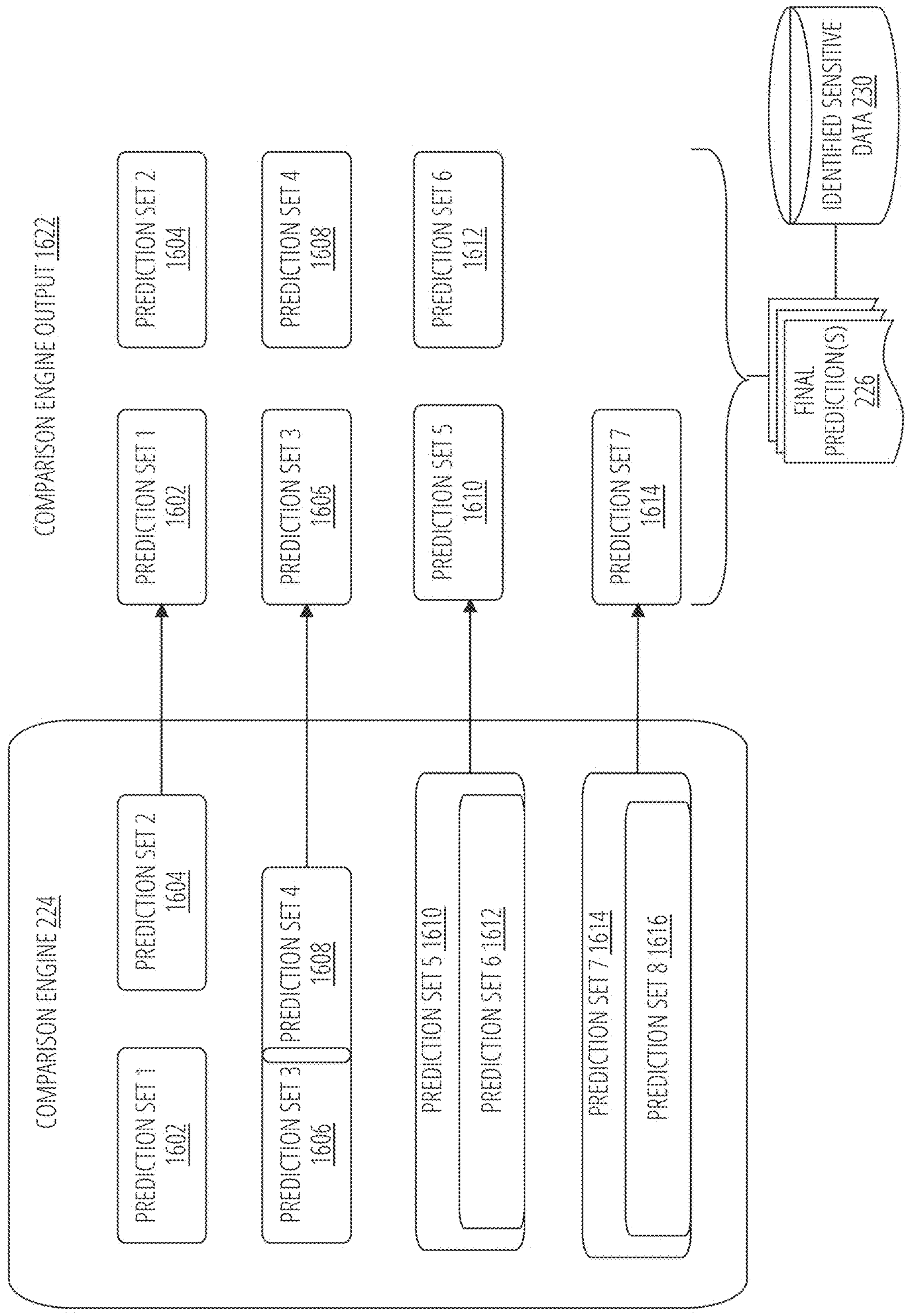
FIG. 16 illustrates operation of the comparison engine, according to some embodiments of the current subject matter.

Once the predictions 216-220 (e.g., sensitive data, sensitive data type, and/or its corresponding location in the electronic document) have been generated by the respective engines 204-208 and/or filtered by the filtering engine 222, they may be provided to the comparison engine 224 for determination of any overlaps among any of the predictions (as for example, shown in FIG. 16). The overlaps may be determined for specific sensitive data (e.g., email addresses), locations of sensitive data (whether or not for the same sensitive data), portions of locations (e.g., partial coordinates, etc.), and/or any combinations thereof. For example, the comparison engine 224 may, upon comparing prediction (s) 216 generated by the prediction engine 204 and prediction(s) 218 generated by the prediction engine 206 may determine that there is some overlap between predicted locations of sensitive data, i.e., "(x1, y1), (x2, y2)" as predicted by the prediction engine 204 and "(x1, y1), (x3, y3)" as predicted by the prediction engine 206. The overlap may be in the location information defined by "(x1, y1)". Likewise, the comparison engine 224 may determine that there is also overlap between predictions generated by engines 204, 206 with predictions generated by engine 208, i.e., "(x1, y1), (x1, y2)". In this case, the overlap may be defined by "(x1, y1") as well as "x1", which may represent various coordinates of the sensitive data. The overlaps may be defined by full overlaps (e.g., location data predicted by one engine entirely matches location data predicted by the other engine, and/or location data predicted by one engine includes entirety of location data predicted by the other engine), and/or partial overlaps (e.g., some location data predicted by one engine matches some location data predicted by the other engine). As can be understood, overlaps may be defined in any other desired way. If neither the location data nor the sensitive data overlap one another, the predictions by the engines may be deemed to be non-overlapping, e.g., "(x1, y1), (x2, y2)" as for example predicted by prediction engine 204 and "(x3, y3), (x4, y4)" as predicted by prediction engine 206, and/or alternatively, or in addition, sensitive email data of "john.smith@company.com" as predicted by prediction engine 206 and sensitive payment card data of "1234 5678 9101 1213" as predicted by prediction engine 208.

Once the comparison is completed, the comparison engine 224 may be configured to generate one or more final prediction(s) 226. The final prediction(s) 226 may include various combinations of the prediction(s) 216, 218, and/or 220, which may be determined based on presence and/or absence of overlaps in the predictions. By way of a non-limiting example, the engine 224 may be configured to output, as final prediction 226, both predictions 216 and 218 if no overlaps between these predictions are detected. The engine 224 may output both predictions 216 and 218 if a partial overlap among these predictions is detected. The final prediction 226 may include both predictions 216 and 218 if prediction 218, for example, includes prediction 216, and/or vice versa, and/or alternatively, or in addition, the final prediction 226 may include only prediction 216 if latter includes prediction 218. Similarly, predictions 220 may likewise be used to determine whether or not the final prediction(s) 226 should include various combinations of predictions 216, 218, and 220. For instance, predictions generated based on predictions 216 and 218 may be compared the prediction(s) 220 and if no overlap is detected, all predictions may be outputted as final prediction(s) 226. Alternatively, or in addition, if a full and/or partial overlap is detected, then a determination may be made whether to output only the prediction(s) 220 as final prediction 226 and/or output all or some of the predictions 216, 218, and/or 220 as final prediction(s) 226.

In some embodiments, one or more of the predictions 216, 218, and/or 220 may be filtered (and thus, ignored, discarded, removed, etc. from the predictions 216, 218, and/or 220) using one or more filtering categories, which may correspond to data categories that are to be selected by some prediction engines but not others, and/or correspond to non-sensitive data categories, and/or correspond to any other criteria (e.g., product names, service names, date, time, etc.). Non-sensitive data categories may be predefined for the purposes of analysis performed by sensitive data detection engine 150. Any number of categories may be used. Filtration of predictions may reduce the amount of processing that may need to be performed by the engine 150 and/or any of its components, thereby increasing processing speed of the computing devices executing functionalities of the sensitive data detection engine 150.

In some example, non-limiting embodiments, the identified sensitive data and its corresponding location(s) may be stored in a storage location, e.g., identified sensitive data 230. The data may be stored as one or more object model(s) and/or any other type of data models. The sensitive data models may include various information about the identified electronic document(s). For example, in the sales data document, the data model may include sales data, customer lists, etc. and may include metadata, identifiers, etc. that may indicate location of the sales data, customer lists, etc. in the document (e.g., page 2 of the sales data, clause no. 5). The data model may also indicate other document portions and/or other documents that may be located prior to, after the sales data, and/or other associated with the document, e.g., a customer list located subsequent to sales data, etc., and/or otherwise be related and/or associated with the sensitive data.

The related and/or associated data may be determined based on a search of the document's contents (e.g., text, images, graphics, etc.) and a determination of a presence of related terms, words, sentences, paragraphs, etc. in both, thereby making them related and, thus, related/associated in the data model. In some embodiments, the data model may include data that may indicate that the sales data may be associated with and/or related to sales data in other types of agreements (e.g., master services agreements, licenses, non-disclosure agreements, etc.). Such data may again be determined based on a search of electronic documents to identify data that may include semantically similar language.

Moreover, the data model may store information related to any other data. For example, in the sales data document, such data may include information about not only customer lists, but also parties to any sales agreements resulting in generation of the sales data, confidential information about terms of the sales agreements, and/or any other information. This data may be used to by prediction engines 204, 206, 208 to, for example, identify any further documents and/or portions of documents that may contain sensitive data.

In some embodiments, the engine 150 may also label various identified sensitive data and/or its locations. For example, a sales clause containing sensitive data, which has been included in the final prediction(s) 226, in sales agreements may be labeled using a label "sales"; a governing law clause in such agreements may be labeled using a label "lease governing law." As can be understood, any labels, identifiers, etc. may be used to identify sensitive data and/or its location. The labeled sensitive data and/or its locations may be stored in the identified sensitive data 230 and may be used for analysis for presence of sensitive data in other documents 202, training of one or more models (e.g., regular expression rules 210, ML model(s) 212, generative AI model(s) 214, etc.), etc.

The locations of sensitive data may be associated with various metadata, which the sensitive data detection engine 150 may use to identify where data/information that may be a candidate for replacement and/or redaction may be located. The sensitive data detection engine 150 may graphically select the identified data/information, e.g., by highlighting it, underlining it, etc. and/or differentiating it in any other way from the remaining data/information in the document. Alternatively, or in addition, the engine 150 may assign certain metadata to the identified data/information so that in any subsequent processing this data/information may be appropriately identified by the assigned metadata. The sensitive data detection engine 150 may include one or more application programming interfaces (APIs) that may be configured to receive the final prediction(s) 226 and determine further processing operations, e.g., which portions of documents should be identified as related to one or more sensitive data and/or thus, would be candidates for redaction and/or replacement.

In some embodiments, a user may use the user device 228 to provide feedback to the sensitive data detection engine 150. The feedback may also be in response to final prediction(s) 226 generated by the engine 150. The feedback may be any type of feedback, such as, for example, a yes/no vote (e.g., thumbs up, thumbs down, etc.) that may be indicative of the user's acceptance of and/or satisfaction with final prediction(s) 226. The feedback may be textual feedback that may include specific comments that may be written and sent to the sensitive data detection engine 150 by the user using the user device 228. As can be understood, any other type of feedback may be provided.

The sensitive data detection engine 150 may receive the user's feedback (whether positive or negative or neutral) and use it for various purposes. For example, the sensitive data detection engine 150 may update the final prediction(s) 226. The sensitive data detection engine 150 may also identify models (e.g., models 210, 212, 214) for the purposes of generating various predictions, determining overlaps, etc. Further, the sensitive data detection engine 150 may use the user's feedback to update such models that are used for any of the above purposes. Alternatively, or in addition, the sensitive data detection engine 150 may generate updated final prediction(s) 226. As can be understood, any other actions may be performed by the sensitive data detection engine 150 based on the user feedback. For example, the sensitive data detection engine 150 may train, re-train, refresh-train and/or create new models (e.g., models 210, 212, 214). Feedback may be used to update any of the above operations and/or how any of them are performed. This process may continue until the user has no further feedback.

Figure 3:
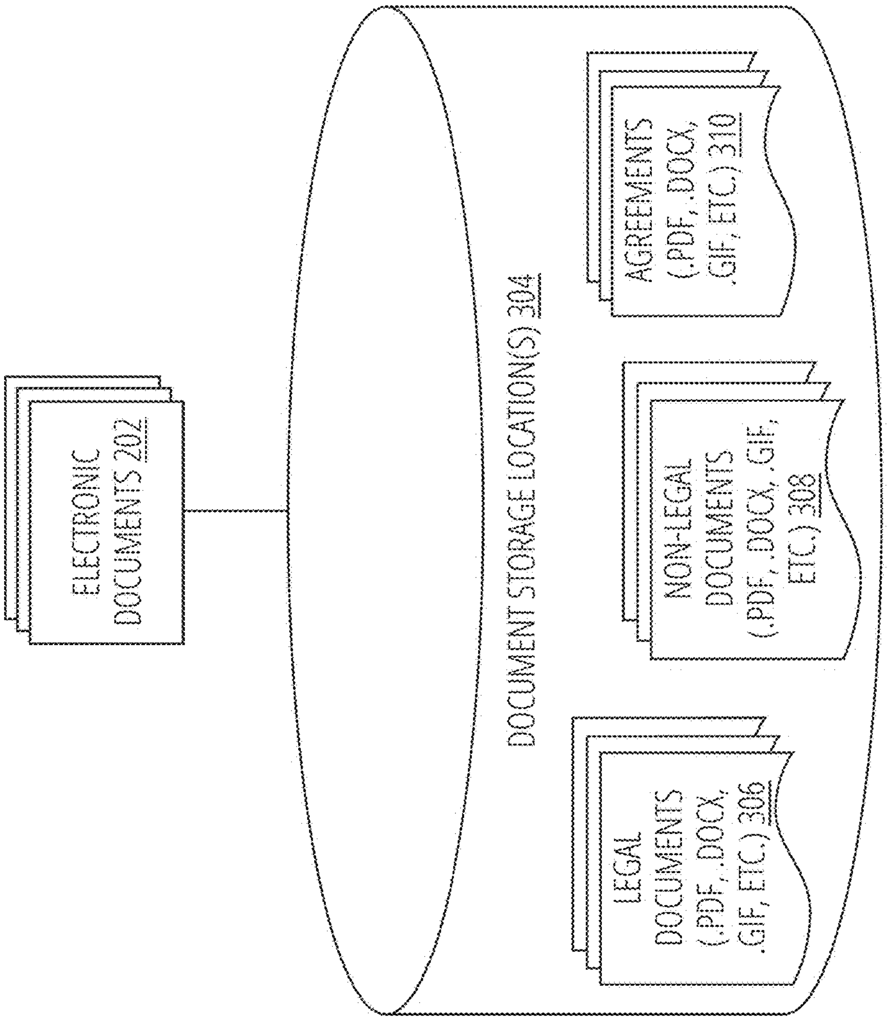
FIG. 3 illustrates an example of document storage location(s) that may be used as a source for the electronic documents, according to some embodiments of the current subject matter.

FIG. 3 illustrates an example of document storage location(s) 304 that may be used as a source for the electronic documents 202, according to some embodiments of the current subject matter. The document storage location(s) 304 may be a single database, repository, etc. and/or multiple databases, repositories, etc. The document storage location (s) 304 may be configured to store any type of documents, data, information, files, etc.

The documents may be any type of documents, such as, for example, agreements, applications, websites, video files, audio files, text files, images, graphics, tables, spreadsheets, computer programs, etc. For example, as shown in FIG. 3, the document storage location(s) 304 may store one or more legal documents 306, non-legal documents 308, and/or agreements 310. Any of the documents 306, 308, and/or 310 may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc. As such, the document storage location(s) 304 may be a unified data storage location that may store any type, any size, any format, etc. documents, data, information, etc.

In some embodiments, the documents stored in the document storage location(s) 304 may be structured, unstructured, and/or semi-structured. Moreover, the documents may be labeled and/or unlabeled. For example, one or more documents stored in the document storage location(s) 304 may have been processed by one or more models (e.g., models 210, 212, 214) to identify sensitive data and/or its locations in documents for redaction/replacement, etc., and/or perform any other operations.

The documents stored in document storage location(s) 304 may be queried, searched, and/or retrieved by and/or provided to the sensitive data detection engine 150 as electronic documents 202. For example, the sensitive data detection engine 150 may retrieve all or particular sales agreements from the document storage location(s) 304 for the purposes of analyzing them to determine sensitive data and/or its location(s) for redaction/replacement.

Figure 4:
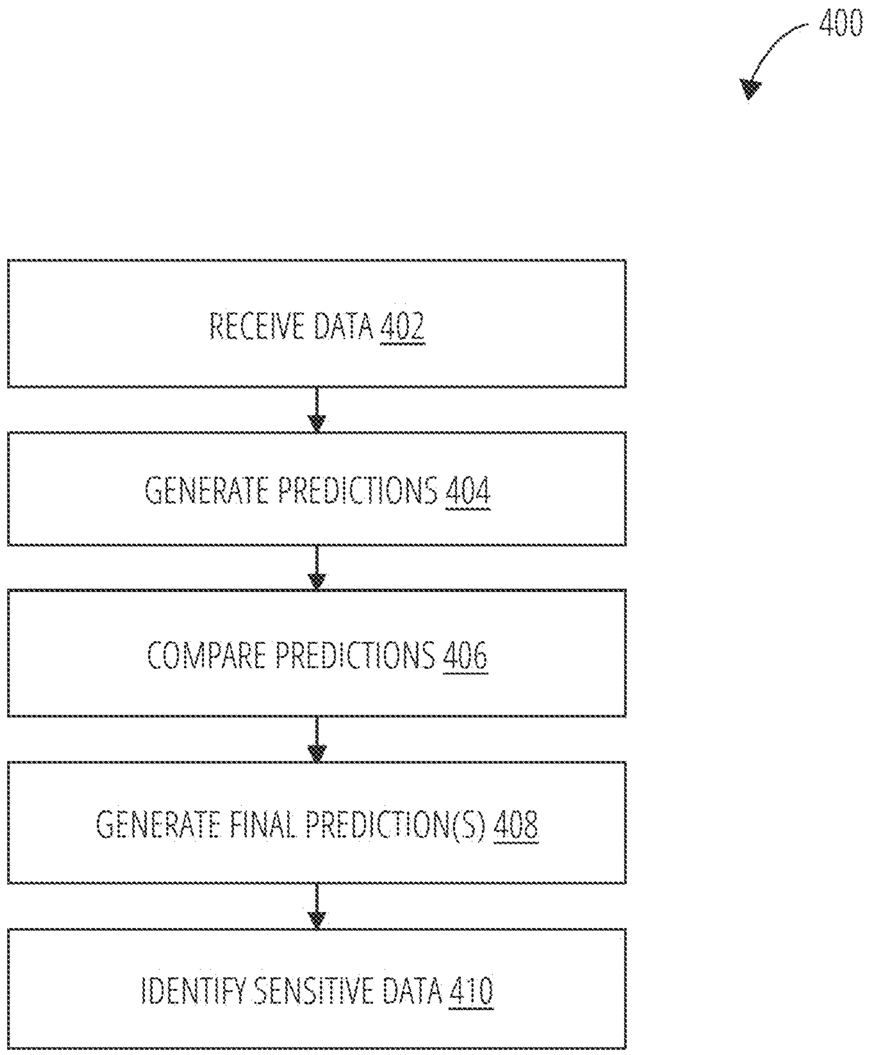
FIG. 4 illustrates an example process for identifying sensitive data and/or its location in documents and/or document portions, according to some embodiments of the current subject matter.

FIG. 4 illustrates an example process 400 for identifying sensitive data and/or its location in documents and/or document portions, according to some embodiments of the current subject matter. The process 400 may be executed using the sensitive data detection engine 150 shown in FIGS. 1-2.

At 402, the sensitive data detection engine 150 may be configured to receive various data related to electronic documents, such as, for example, electronic documents 202. The documents 202 may or may not contain data/information that may include sensitive data (e.g., trade secrets, confidential information, etc.). The data in such documents 202 may be structured and/or unstructured. Further, the electronic documents 202 may be labeled and/or unlabeled. The documents may come from one or more storage locations and/or sources. For example, data storages may be private databases with various access rights and/or privileges (e.g., internal company databases, specific user access databases, etc.). In some cases, the private databases may store documents in an organized predetermined fashion, which may allow ease of access to the electronic documents and/or any portions thereof. For instance, the documents 202 stored in private databases may be labeled, searchable, and/or otherwise, easily identifiable. In other cases, the documents may be stored in such databases in an unstructured format. The documents 202 may be stored in any desired electronic formats, e.g., PDF, .docx, .xls, etc.

The documents 202 may also be received from public non-government databases, government databases (e.g., SEC-EDGAR, etc.), etc. and/or any other data sources. These sources may store various legal documents (e.g., commercial contracts, lease agreements, public disclosures, etc.), non-legal documents, and/or any other types of documents. The documents 202 may be identified using various identifiers allowing location/retrieval of these documents in/from the databases.

At 404, the prediction engines 204, 206, and/or 208 of the sensitive data detection engine 150 may be configured to generate one or more corresponding prediction(s) 216, 218, and/or 220 based on one or more of the electronic documents. The engines 204-208 may be configured to process one document at a time, or several electronic documents in parallel. In some example embodiments, the engines 204-208 may be configured to use one or more respective models (e.g., 210, 212, 214) to generate predictions indicating presence (e.g., location) of sensitive data in the processed documents. For example, the engine 204 may use regular expressions rules or models to determine presence of an email based on a rule identifying email as "name@domain.com". Engines 206 and 208 may use models (e.g., machine learning models, large language models, generative AI models, etc.) that may be trained and/or fine-tuned using historical data that may include sensitive data, location of sensitive data, etc., which has been previously identified in electronic documents that may or may not have specific type. The training data may be obtained from identified sensitive data 230.

The predictions 216-220 may be filtered, by the filtering engine 222, using various categories of data that identify some data as being not sensitive. The comparison engine 224 may be configured to receive predictions 216-220 (either filtered or not filtered) and compare them, at 406, to identify one or more overlapping and/or non-overlapping predictions. The comparison may be performed using specific type of sensitive data (e.g., banking information, names, email addresses, demographics, etc.), location of sensitive data information within documents, etc. The comparison engine 224 may then make a determination whether to output, all predictions 216-220, or output some predictions (e.g., when one prediction includes entirety of another prediction). Moreover, the filtering engine 222 may also filter one or more of the predictions 216-220 prior to providing them to the comparison engine 224, which reduces computing burden on the computing devices executing operations of the engine 150.

Each predictions (e.g., sensitive data, sensitive data type, location of sensitive data, any label associated therewith, etc.) may be stored in a storage location (e.g., identified sensitive data 230 storage location) as a data model. As stated above, the data model may include various information (e.g., metadata, identifiers, etc.) related to the sensitive data and/or its location, such as, for example, identification of the sensitive data, location of the sensitive data within a particular electronic document 202, relationship of the sensitive data to other sensitive data within the same document and/or to document portions in other documents of the same or different types, identification of the document type of the document containing the sensitive data, and/or any other data.

At 408, the comparison engine 224 of sensitive data detection engine 150 may be configured to output final prediction(s) 226 based on the predictions 216-220. The final prediction(s) 226 may be configured to identify not only the sensitive data contained in the document, but where it is located, and/or any other relevant characteristics. At 410, the engine 150 (and/or any other processing device) may be used to identify specific sensitive data in the document and output, for example, a redacted document that conceals identified sensitive data.

In some embodiments, one or more users, such as, use of a computing user device 228 may provide feedback to the final prediction(s) 226 and/or other predictions. For instance, the user may indicate that a sales term clause does not constitute a sensitive data. The feedback may be provided to one or more engine 150, which may use it to update the final prediction(s) 226, predictions 216-220, models 210-214, and/or perform any other actions.

Figure 5:
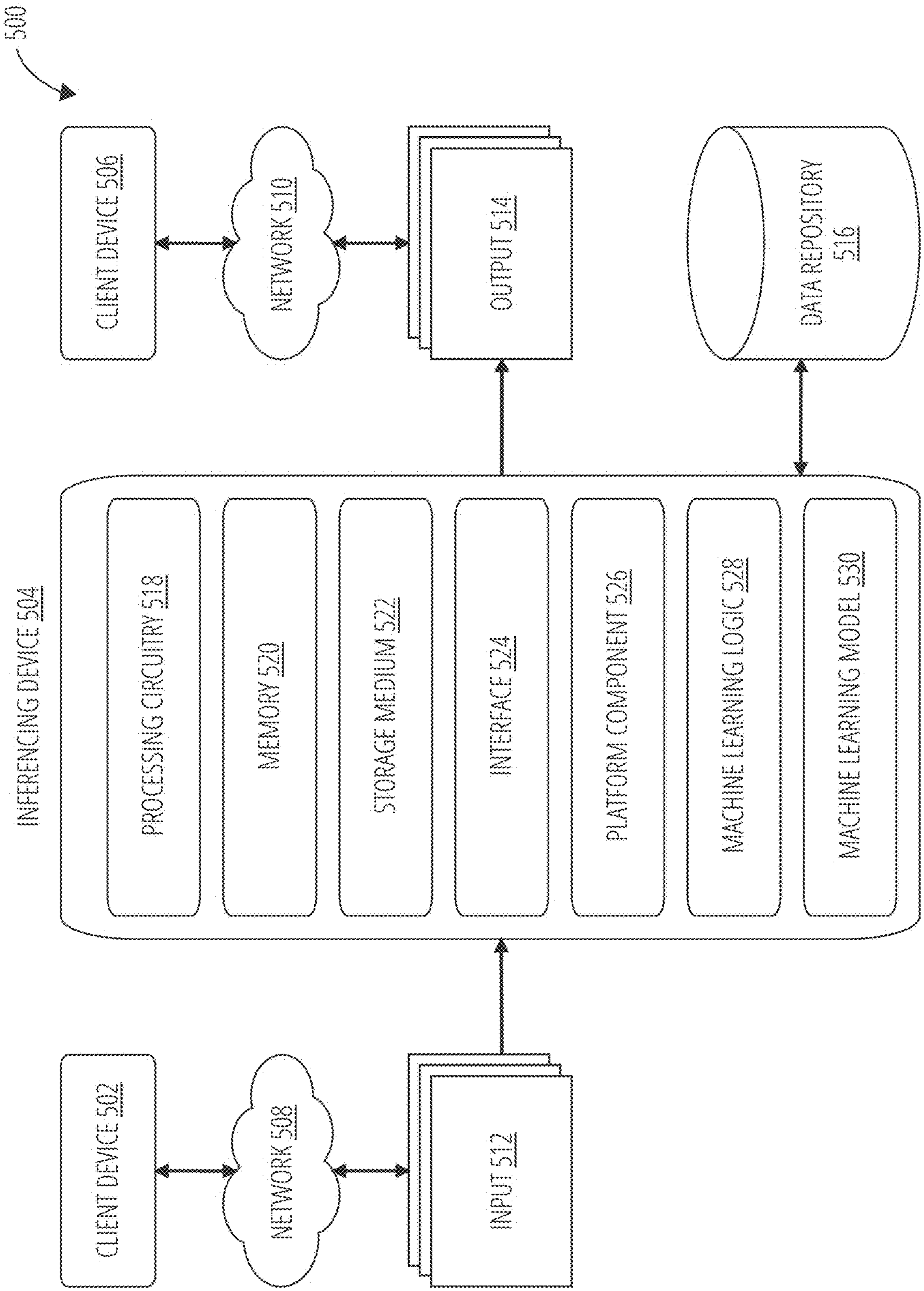
FIG. 5 illustrates an example of an AI/ML system that may be used for generating one or more transaction packages and/or guiding the user through one or more tasks, documents, etc., according to some embodiments of the current subject matter.

FIG. 5 illustrates an example of an AI/ML system 500 that may be used for generating one or more portions of an electronic document 202 based on a structure of the document, etc., according to some embodiments of the current subject matter. The system 500 may include a set of M devices, where Mis any positive integer. As shown in FIG. 5, the system 500 may include three devices (M=3), such as a client device 502, an inferencing device 504, and a client device 506. The inferencing device 504 may communicate information with the client device 502 and the client device 506 over a network 508 and a network 510, respectively. The information may include input 512 from the client device 502 and output 514 to the client device 506, or vice-versa.

In some embodiments, the input 512 and the output 514 may be communicated between the same client device 502 or client device 506. In another alternative, the input 512 and the output 514 may be stored in a data repository 516. Alternatively, or in addition, the input 512 and the output 514 are communicated via a platform component 526 of the inferencing device 504, such as an input/output (I/O) device (e.g., a touchscreen, a microphone, a speaker, etc.).

As shown in FIG. 5, the inferencing device 504 may include a processing circuitry 518, a memory 520, a storage medium 522, an interface 524, a platform component 526, ML logic 528, and an ML model 530. In some embodiments, the inferencing device 504 may include other components and/or devices as well. Examples for software elements and hardware elements of the inferencing device 504 are described in more detail with reference to a computing architecture 2100 as depicted in FIG. 21. Embodiments are not limited to these examples.

The inferencing device 504 may generally be arranged to receive an input 512, process the input 512 via one or more AI/ML techniques, and send an output 514. The inferencing device 504 may receive the input 512 from the client device 502 via the network 508, the client device 506 via the network 510, the platform component 526 (e.g., a touchscreen as a text command or microphone as a voice command), the memory 520, the storage medium 522 or the data repository 516. The inferencing device 504 may send the output 514 to the client device 502 via the network 508, the client device 506 via the network 510, the platform component 526 (e.g., a touchscreen to present text, graphic or video information or speaker to reproduce audio information), the memory 520, the storage medium 522 or the data repository 516. Examples for the software elements and hardware elements of the network 508 and the network 510 are described in more detail with reference to a communications architecture 2200 as depicted in FIG. 22. Embodiments are not limited to these examples.

The inferencing device 504 may include ML logic 528 and an ML model 530 to implement various AI/ML techniques for various AI/ML tasks. The ML logic 528 may receive the input 512 and process the input 512 using the ML model 530. The ML model 530 may perform inferencing operations to generate an inference for a specific task from the input 512. In some embodiments, the inference is part of the output 514. The output 514 may be used by the client device 502, the inferencing device 504, or the client device 506 to perform subsequent actions in response to the output 514.

In some embodiments, the ML model 530 may be a trained ML model 530 using a set of training operations. An example of training operations to train the ML model 530 is described with reference to FIG. 6.

Figure 6:
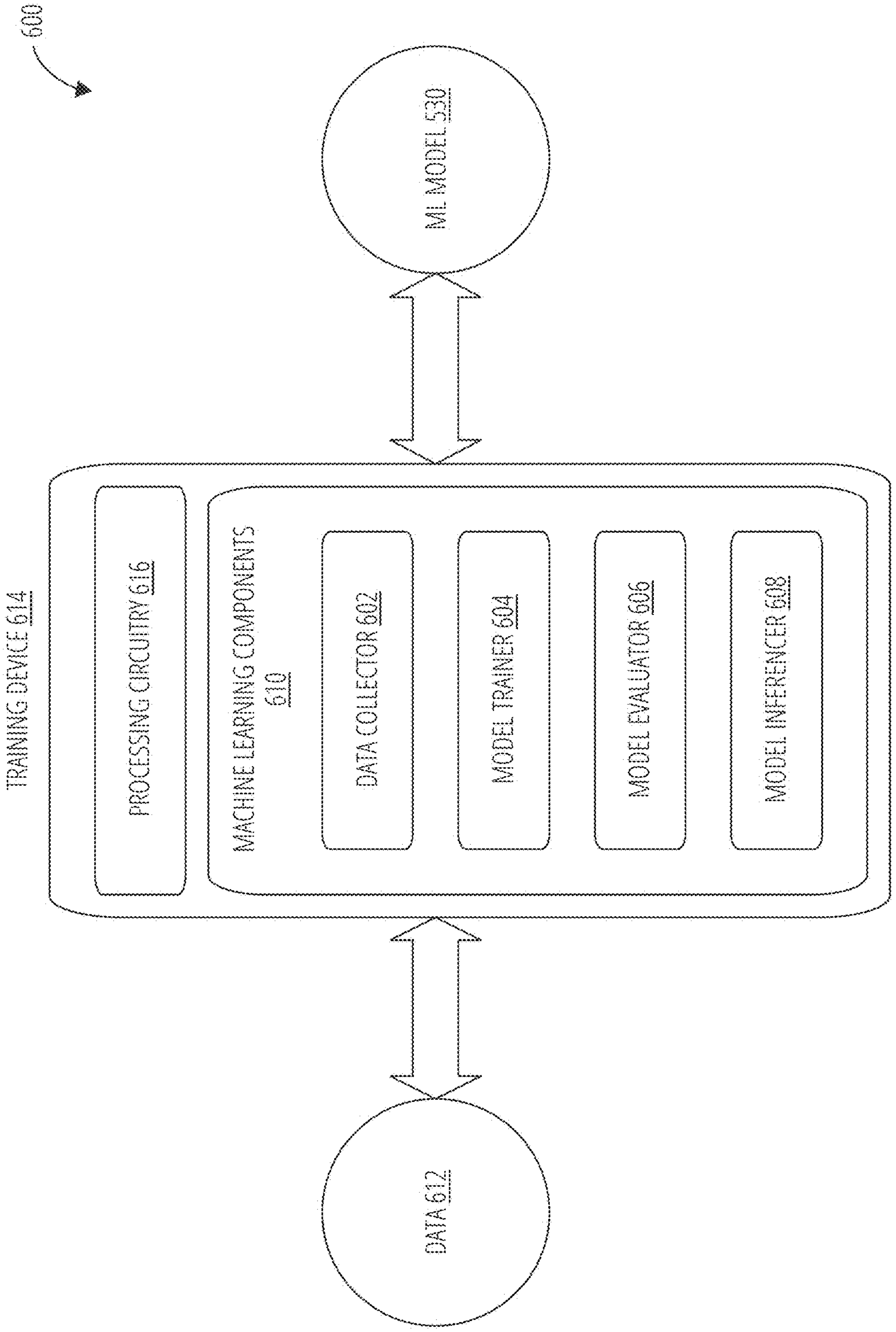
FIG. 6 illustrates an example apparatus that may include a training device suitable to generate a trained ML model for the inferencing device of the system shown in FIG. 4.

FIG. 6 illustrates an example apparatus 600 that may include a training device 614 suitable to generate a trained ML model 530 for the inferencing device 504 of the system 500. As shown in FIG. 6, the training device 614 may include a processing circuitry 616 and a set of ML components 610 to support various AI/ML techniques, such as a data collector 602, a model trainer 604, a model evaluator 606 and a model inferencer 608.

In general, the data collector 602 may collect data 612 from one or more data sources to use as training data for the ML model 530. The data collector 602 may collect different types of data 612, such as, text information, audio information, image information, video information, graphic information, and so forth. The model trainer 604 may receive as input the collected data and uses a portion of the collected data as test data for an AI/ML algorithm to train the ML model 530. The model evaluator 606 may evaluate and improve the trained ML model 330 using a portion of the collected data as test data to test the ML model 530. The model evaluator 606 may also use feedback information from the deployed ML model 530. The model inferencer 608 may implement the trained ML model 530 to receive as input new unseen data, generate one or more inferences on the new data, and output a result such as an alert, a recommendation or other post-solution activity.

An exemplary AI/ML architecture for the ML components 610 is described in more detail with reference to FIG. 7.

FIG. 7 illustrates an artificial intelligence architecture 700 that may be used by the training device 614 to generate the ML model 530 (e.g., models 210-214, as shown in FIG. 2) for deployment by the inferencing device 304. The artificial intelligence architecture 700 is an example of a system suitable for implementing various AI techniques and/or ML techniques to perform various inferencing tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 700 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 530, evaluate performance of the trained ML model 530, and deploy the tested ML model 530 as the trained ML model 530 in a production environment, and continuously monitor and maintain it.

The ML model 530 may be a mathematical construct used to predict outcomes based on a set of input data. The ML model 530 may be trained using large volumes of training data 726, and it can recognize patterns and trends in the training data 726 to make accurate predictions. The ML model 530 may be derived from an ML algorithm 724 (e.g., a neural network, decision tree, support vector machine, etc.). A data set is fed into the ML algorithm 724 which trains an ML model 530 to "learn" a function that produces mappings between a set of inputs and a set of outputs with a reasonably high accuracy. Given a sufficiently large enough set of inputs and outputs, the ML algorithm 724 may find the function for a given task. This function may even be able to produce the correct output for input that it has not seen during training. A data scientist prepares the mappings, selects and tunes the ML algorithm 724, and evaluates the resulting model performance. Once the ML logic 528 is sufficiently accurate on test data, it can be deployed for production use.

The ML algorithm 724 may include any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 724 of the artificial intelligence architecture 700 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 7, the artificial intelligence architecture 700 includes a set of data sources 702 to source data 704 for the artificial intelligence architecture 700. Data sources 702 may comprise any device capable generating, processing, storing or managing data 704 suitable for a ML system. The data sources 702 may receive data 750 associated with documents (e.g., type of documents, portion(s) of document content(s) and/or entire contents of document(s), transactions data (e.g., type of transaction, transaction identifier, requests associated with the transaction, etc.), and/or any other data. It should be noted that the data 750 may also be supplied during training phase of the model. Some additional, non-limiting, examples of data sources 702 include without limitation databases, web scraping, sensors and Internet of Things (IoT) devices, image and video cameras, audio devices, text generators, publicly available databases, private databases, and many other data sources 702. The data sources 702 may be remote from the artificial intelligence architecture 700 and accessed via a network, local to the artificial intelligence architecture 700 an accessed via a network interface or may be a combination of local and remote data sources 702.

The data sources 702 source difference types of data 704 (which may include data 750 related to documents, transactions, etc.). By way of example and not limitation, the data 704 includes structured data from relational databases, such as customer profiles, transaction histories, or product inventories. The data 704 includes unstructured data from websites such as customer reviews, news articles, social media posts, or product specifications. The data 704 includes data from temperature sensors, motion detectors, and smart home appliances. The data 704 includes image data from medical images, security footage, or satellite images. The data 704 includes audio data from speech recognition, music recognition, or call centers. The data 704 includes text data from emails, chat logs, customer feedback, news articles or social media posts. The data 704 includes publicly available datasets such as those from government agencies, academic institutions, or research organizations. These are just a few examples of the many sources of data that can be used for ML systems. It is important to note that the quality and quantity of the data is critical for the success of a machine learning project.

The data 704 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 702 may be communicatively coupled to a data collector 602. The data collector 602 may gather relevant data 704 from the data sources 702. Once collected, the data collector 602 may use a pre-processor 706 to make the data 704 suitable for analysis. This may involve data cleaning, transformation, and feature engineering. Data preprocessing is a critical step in ML as it directly impacts the accuracy and effectiveness of the ML model 530. The pre-processor 706 receives the data 704 as input, processes the data 704, and outputs pre-processed data 716 for storage in a database 708. Examples for the database 708 includes a hard drive, solid state storage, and/or random-access memory (RAM).

The data collector 602 is communicatively coupled to a model trainer 604. The model trainer 604 may perform AI/ML model training, validation, and testing which may generate model performance metrics as part of the model testing procedure. The model trainer 604 may receive the pre-processed data 716 as input 710 or via the database 708. The model trainer 604 may implement a suitable ML algorithm 724 to train an ML model 530 on a set of training data 726 from the pre-processed data 716. The training process may involve feeding the pre-processed data 716 into the ML algorithm 724 to produce or optimize an ML model 530. The training process may adjust its parameters until it achieves an initial level of satisfactory performance.

The model trainer 604 may be communicatively coupled to a model evaluator 606. After an ML model 530 is trained, the ML model 530 may need to be evaluated to assess its performance. This is done using various metrics such as accuracy, precision, recall, and F1 score. The model trainer 604 may output the ML model 530, which is received as input 710 or from the database 708. The model evaluator 606 may receive the ML model 530 as input 712, and it initiates an evaluation process to measure performance of the ML model 530. The evaluation process may include providing feedback 718 to the model trainer 404. The model trainer 604 may re-train the ML model 530 to improve performance in an iterative manner.

The model evaluator 606 may be communicatively coupled to the model inferencer 608. The model inferencer 608 may provide AI/ML model inference output (e.g., inferences, predictions or decisions). Once the ML model 530 is trained and evaluated, it may be deployed in a production environment where it is used to make predictions on new data. The model inferencer 608 may receive the evaluated ML model 530 as input 714. The model inferencer 608 may use the evaluated ML model 530 to produce insights or predictions on real data, which may be deployed as a final production ML model 530. The inference output of the ML model 530 may be use case specific. The model inferencer 608 may also perform model monitoring and maintenance, which involves continuously monitoring performance of the ML model 530 in the production environment and making any necessary updates or modifications to maintain its accuracy and effectiveness. The model inferencer 608 may provide feedback 718 to the data collector 602 to train or re-train the ML model 530. The feedback 718 may include model performance feedback information, which may be used for monitoring and improving performance of the ML model 330.

Some or all of the model inferencer 408 may be implemented by various actors 722 in the artificial intelligence architecture 700, including the ML model 530 of the inferencing device 504, for example. The actors 722 may use the deployed ML model 530 on new data to make inferences or predictions for a given task and output an insight 732. The actors 722 may implement the model inferencer 608 locally, or remotely receives outputs from the model inferencer 608 in a distributed computing manner. The actors 722 may trigger actions directed to other entities or to itself. The actors 722 provide feedback 720 to the data collector 602 via the model inferencer 408. The feedback 720 may include data needed to derive training data, inference data or to monitor the performance of the ML model 530 and its impact to the network through updating of key performance indicators (KPIs) and performance counters.

As discussed above, the systems 100, 500 implement some or all of the artificial intelligence architecture 700 to support various use cases and solutions for various AI/ML tasks. In some embodiments, the training device 614 of the apparatus 600 may use the artificial intelligence architecture 700 to generate and train the ML model 530 for use by the inferencing device 504 for the system 100. In one embodiment, for example, the training device 614 may train the ML model 530 as a neural network, as described in more detail with reference to FIG. 8. Other use cases and solutions for AI/ML are possible as well, and embodiments are not limited in this context.

Figure 8:
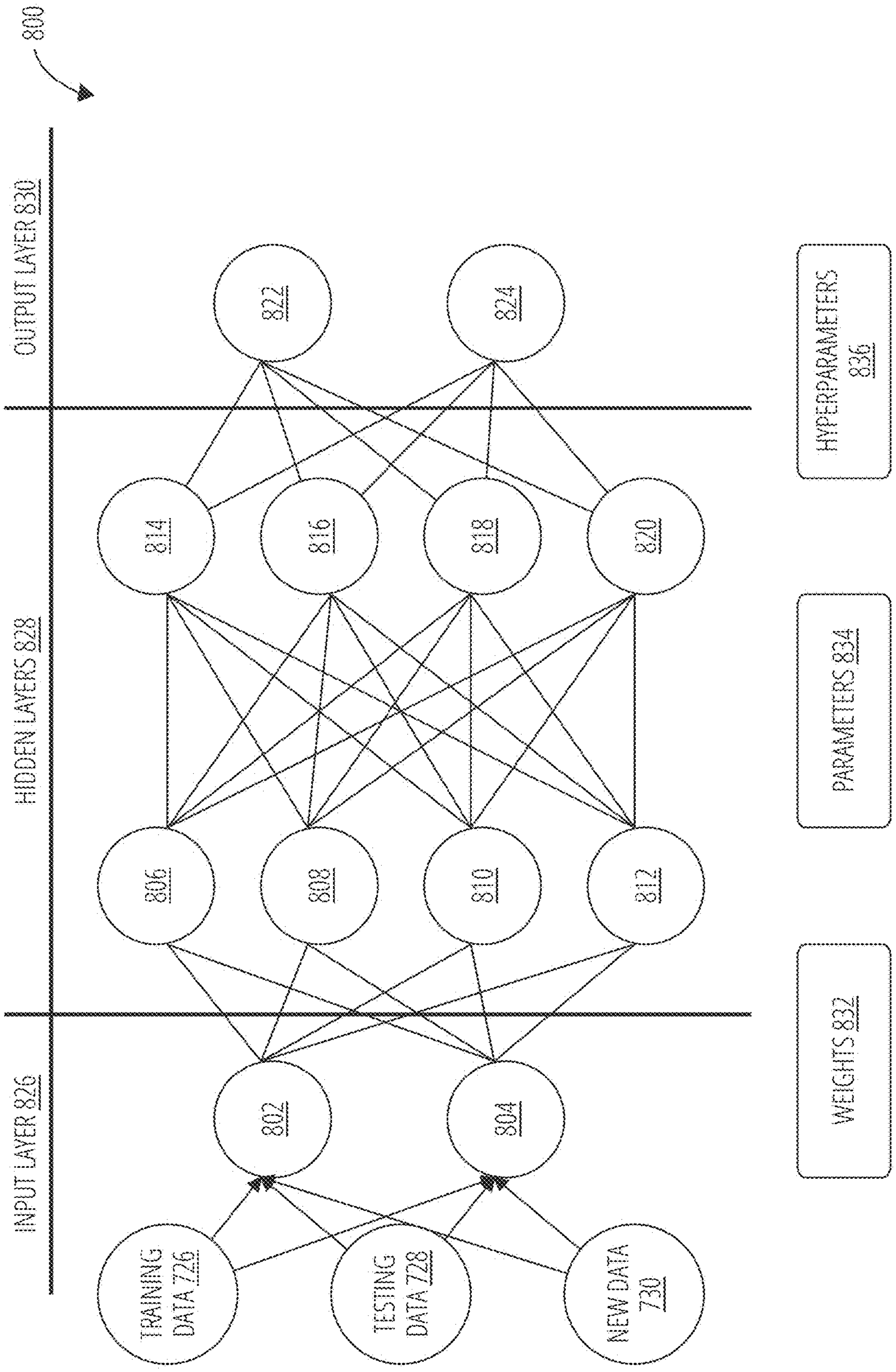
FIG. 8 illustrates an artificial neural network in accordance with one embodiment.

FIG. 8 illustrates an embodiment of an artificial neural network 800. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 800 may include multiple node layers, containing an input layer 826, one or more hidden layers 828, and an output layer 830. Each layer comprises one or more nodes, such as nodes 802 to 824. As shown in FIG. 8, for example, the input layer 826 may include nodes 802, 804. The artificial neural network 800 may include two hidden layers 828, with a first hidden layer having nodes 806, 808, 810 and 812, and a second hidden layer having nodes 814, 816, 818 and 820. The artificial neural network 800 may include an output layer 830 with nodes 822, 824. Each node 802 to 824 may include a processing element (PE), or artificial neuron, which connects to another and has an associated weight and threshold. If the output of any individual node is above the specified threshold value, that node may be activated, sending data to the next layer of the network. Otherwise, no data is passed along to the next layer of the network.

In general, artificial neural network 800 may rely on training data 726 to learn and improve accuracy over time. However, once the artificial neural network 800 may be fine-tuned for accuracy, and tested on testing data 728, the artificial neural network 800 may be ready to classify and cluster new data 730 at a high velocity. Tasks in speech recognition or image recognition can take minutes versus hours when compared to the manual identification by human experts.

Each individual node 802 to 824 may be a linear regression model, composed of input data, weights, a bias (or threshold), and an output. The linear regression model may have a formula similar to Equation (1), as follows:

$$\Sigma\text{wixi+bias}=w1x1+w2x2+w3x3+\text{bias}$$

$$\text{output}=f(x)=1 \text{ if } \Sigma w1x1+b>=0;\ 0 \text{ if } \Sigma w1x1+b<0 \qquad \text{EQUATION (1)}$$

Once an input layer 826 is determined, a set of weights 832 may be assigned. The weights 832 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 800 as a feedforward network.

In some embodiments, the artificial neural network 800 may leverage sigmoid neurons, which are distinguished by having values between 0 and 1. Since the artificial neural network 800 behaves similarly to a decision tree, cascading data from one node to another, having x values between 0 and 1 will reduce the impact of any given change of a single variable on the output of any given node, and subsequently, the output of the artificial neural network 800.

The artificial neural network 800 may have many practical use cases, like image recognition, speech recognition, text recognition or classification. The artificial neural network 800 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 834 of the model adjust to gradually converge at the minimum.

In one embodiment, the artificial neural network 800 is feedforward, meaning it flows in one direction only, from input to output. In one embodiment, the artificial neural network 800 uses backpropagation. Backpropagation is when the artificial neural network 800 moves in the opposite direction from output to input. Backpropagation allows calculation and attribution of errors associated with each neuron 802 to 824, thereby allowing adjustment to fit the parameters 834 of the ML model 530 appropriately.

The artificial neural network 800 is implemented as different neural networks depending on a given task. Neural networks are classified into different types, which are used for different purposes. In one embodiment, the artificial neural network 800 is implemented as a feedforward neural network, or multi-layer perceptrons (MLPs), comprised of an input layer 826, hidden layers 828, and an output layer 830. While these neural networks are also commonly referred to as MLPs, they are actually comprised of sigmoid neurons, not perceptrons, as most real-world problems are nonlinear. Trained data 704 usually is fed into these models to train them, and they are the foundation for computer vision, natural language processing, and other neural networks. In one embodiment, the artificial neural network 800 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 800 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 800 is implemented as any type of neural network suitable for a given operational task of system 100, and the MLP, CNN, and RNN are merely a few examples. Embodiments are not limited in this context.

The artificial neural network 800 may include a set of associated parameters 834. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some embodiments, the artificial neural network 800 may be implemented as a deep learning neural network. The term deep learning neural network refers to a depth of layers in a given neural network. A neural network that has more than three layers-which would be inclusive of the inputs and the output—can be considered a deep learning algorithm. A neural network that only has two or three layers, however, may be referred to as a basic neural network. A deep learning neural network may tune and optimize one or more hyperparameters 836. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 9 illustrates an example of a document corpus 908 suitable for use by the sensitive data detection engine 150 of the server device 102. The document corpus 908 may be stored in one or more database and/or storage locations and may be accessible (e.g., via a query) by the sensitive data detection engine 150. In general, a document corpus is a large and structured collection of electronic documents, such as text documents, which are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 9, the document corpus 908 may include information from electronic documents 918 derived from the document records 138 stored in the data store 126. The electronic documents 918 may include any electronic document having metadata such as STME 132 suitable for receiving an electronic signature, including both signed electronic documents or unsigned electronic documents. Different sets of the electronic documents 918 of the document corpus 908 may be associated with different entities. For example, a first set of electronic documents 918 is associated with a company A 902. A second set of electronic documents 918 is associated with a company B 904. A third set of electronic documents 918 is associated with a company C 906. A fourth set of electronic documents 918 is associated with a company D 910. Although some embodiments discuss the document corpus 908 having electronic documents 918, it may be appreciated that the document corpus 908 may have unsigned electronic document as well, which may be mined using the AI/ML techniques described herein. Embodiments are not limited in this context.

Each set of electronic documents 918 associated with a defined entity may include one or more subsets of the electronic documents 918 categorized by document type. For instance, the second set of electronic documents 918 associated with company B 904 may have a first subset of electronic documents 918 with a document type for supply agreements 912, a second subset of electronic documents 918 with a document type for lease agreements 916, and a third subset of electronic documents 918 with a document type for service agreements 914. In one embodiment, the sets and subsets of electronic documents 918 may be identified using labels manually assigned by a human operator, such as metadata added to a document record for a signed electronic document created in a document management system, or feedback from a user of the system 100 during a document generation process. In one embodiment, the sets and subsets of electronic documents 918 may be unlabeled.

Figure 10:
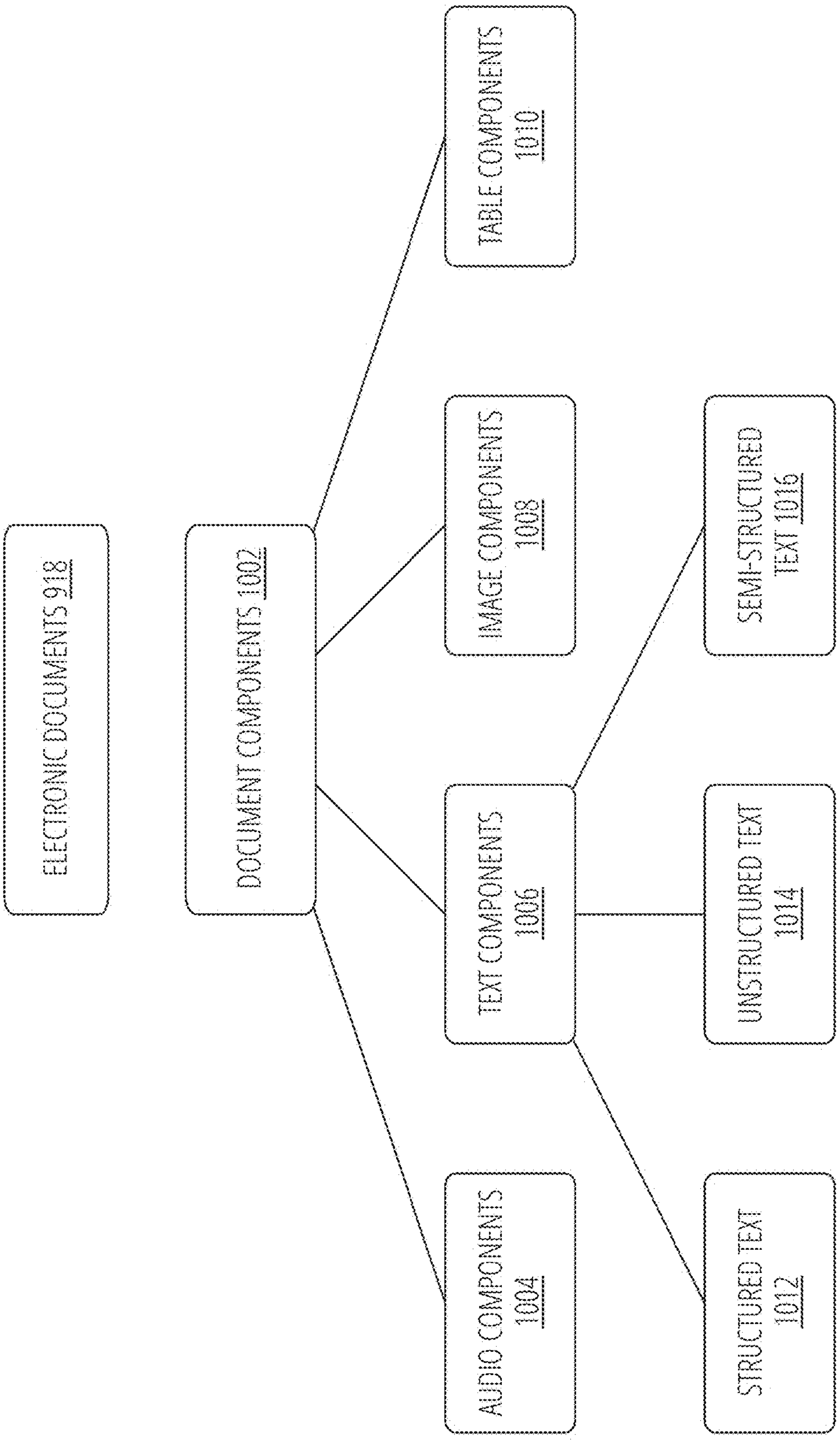
FIG. 10 illustrates electronic documents in accordance with one embodiment.

FIG. 10 illustrates an example of an electronic document 918. An electronic document 918 may include different information types that collectively form a set of document components 1002 for the electronic document 918. The document components 1002 may comprise, for example, one or more audio components 1004, text components 1006, image components 1008, or table components 1010. Each document component 1002 may comprise different content types. For example, the text components 1006 may comprise structured text 1012, unstructured text 1014, or semi-structured text 1016.

Structured text 1012 refers to text information that is organized in a specific format or schema, such as words, sentences, paragraphs, sections, clauses, and so forth. Structured text 1012 has a well-defined set of rules that dictate how the data should be organized and represented, including the data types and relationships between data elements.

Unstructured text 1014 refers to text information that does not have a predefined or organized format or schema. Unlike structured text 1012, which is organized in a specific way, unstructured text 1014 can take various forms, such as text information stored in a table, spreadsheet, figures, equations, header, footer, filename, metadata, and so forth.

Semi-structured text 1016 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 11:
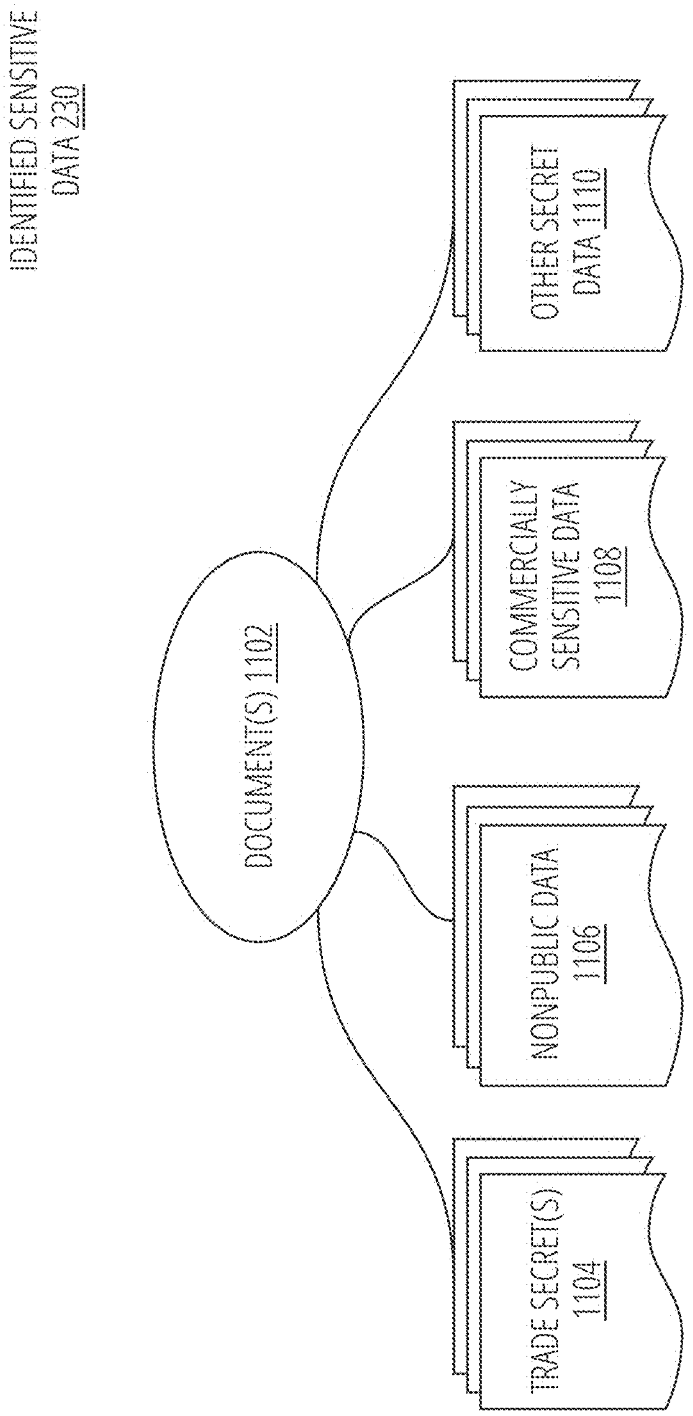
FIG. 11 illustrates an example identified sensitive data, according to some embodiments of the current subject matter.

FIG. 11 illustrates an example identified sensitive data 230, according to some embodiments of the current subject matter. The object models stored in the library 230 may include one or more of the document(s) 1102 (e.g., from electronic documents 202), which may include various sensitive data, such as, for example, trade secret(s) 1104, nonpublic data 1106, commercially sensitive data 1108, and/or any other data other secret data 1110, and/or any other data, and/or any combination thereof. The data contained in any of these may include any of type of data, metadata, identifiers, etc. The data 1104-1110 may include any other data, e.g., information about parties to agreements, description of products being sold, identification of trade secrets, and/or any other information.

Figure 12:
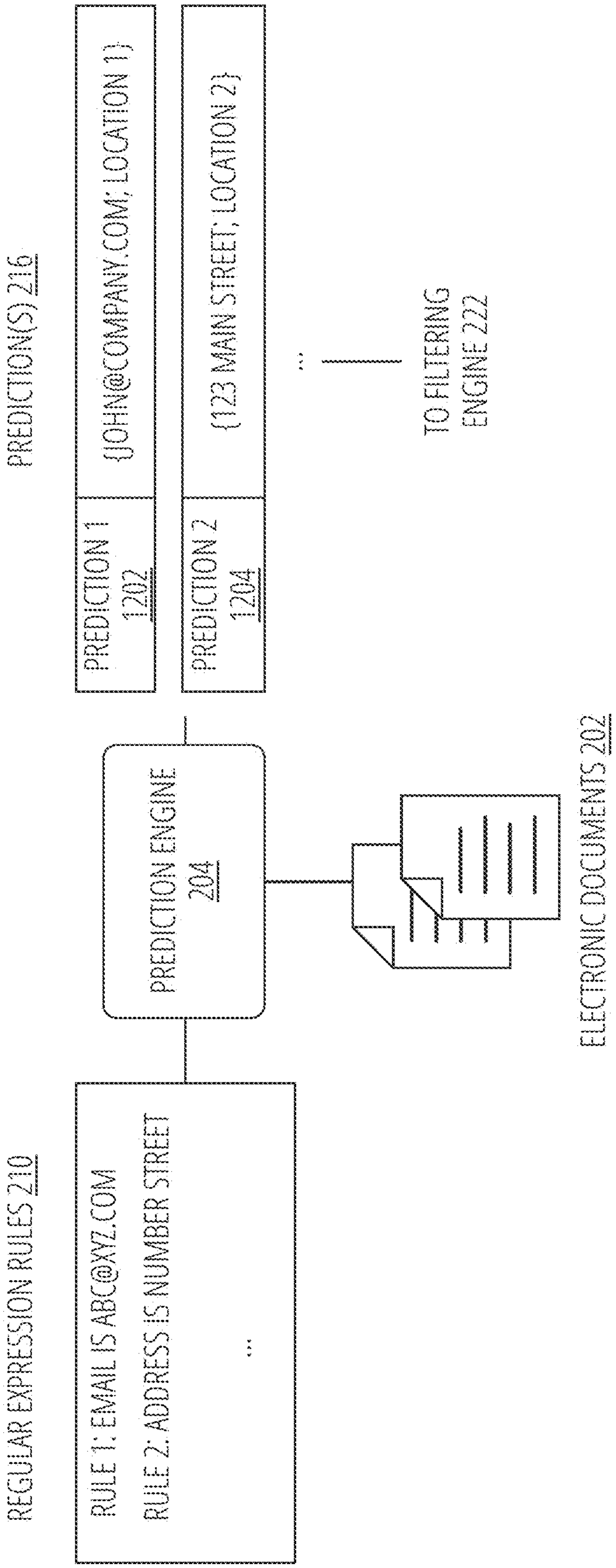
FIG. 12 illustrates operation of a prediction engine, according to some embodiments of the current subject matter.

FIG. 12 illustrates operation of the prediction engine 204, according to some embodiments of the current subject matter. The prediction engine 204 may be configured to analyze one or more electronic documents 202 using regular expression rules 210 and generate one or more prediction(s) 216 that may include an identification of sensitive data and its location with a specific document and/or documents 202.

The engine 204 may implement one or more models that may be represented by one or more rules 210. Alternatively, or in addition, the rules 210 may be coded and no model may be used by the prediction engine 204. The rules 210 may be regular expression rules, which may identify specific expressions that the engine 204 may look for when analyzing electronic documents 202. The rules 210 may be organized in one or more categories that may be related to specific type of sensitive data. For example, some rules may seek to identify banking information (e.g., IBAN sequences, payment card information, etc.), demographic information (e.g., age, gender, religion, etc.), personal identifiable information (e.g., name, address, social security number sequence, etc.), and/or any other categories of information. One or more rules 210 may be applicable to all types of electronic documents 202. Alternatively, or in addition, specific rules 210 may be applicable to only specific type of documents, e.g., banking information rules 210 may be applicable to financial type documents, such as, for example, loan agreements, financial service agreements, etc. As can be understood, any type of rules 210 may be used and/or applied, as desired, to any type of documents.

By way of a non-limiting example, as shown in FIG. 12, the regular expression rules 210 may be configured to include a regular expression Rule 1 that states "Email is ABC@XYZ.COM", which may be used to detect email addresses in electronic documents 202. The rules 210 may also include another regular expression Rule 2 that states "Address is NUMBER STREET", which may be used to detect address information in documents 202. As can be understood, the rules 210 may include any other type of rules.

The prediction engine 204 may use the Rule 1 and Rule 2 when analyzing documents 202 to generate one or more prediction(s) 216. For example, using Rule 1, the prediction engine 204 may generate prediction 1 1202, which may state "{JOHN@COMPANY.COM; LOCATION 1"}", where JOHN@COMPANY.COM may correspond to the sensitive data (i.e., email) and LOCATION 1 may correspond to where such sensitive data may be found (e.g., first page, first line, and/or coordinates {(x1, y1), (x2, y2)}). Similarly, using Rule 2, the prediction engine 204 may generate prediction 2 1204, which may state "{123 MAIN STREET; LOCATION 2}", where 123 MAIN STREET may correspond to the sensitive data (i.e., address) and LOCATION 2 may correspond to where such sensitive data may be found (e.g., first page, second line, and/or coordinates {(x3, y3), (x4, y4)}).

The prediction 1 1202 and prediction 2 1204 may then be provided to filtering engine 222, which may filter out some of the predictions based on an indication that some of the data should not be included. For example, the filtering engine 222 may include a filtering rule that may indicate that a certain category should not be included. Thus, the filtering engine 222 may exclude prediction 2 1204 from the prediction(s) 216 and only provide prediction 1 1202, as its prediction(s) 216. As can be understood, any other types of filtering may be applied to predictions 216.

Figure 13:
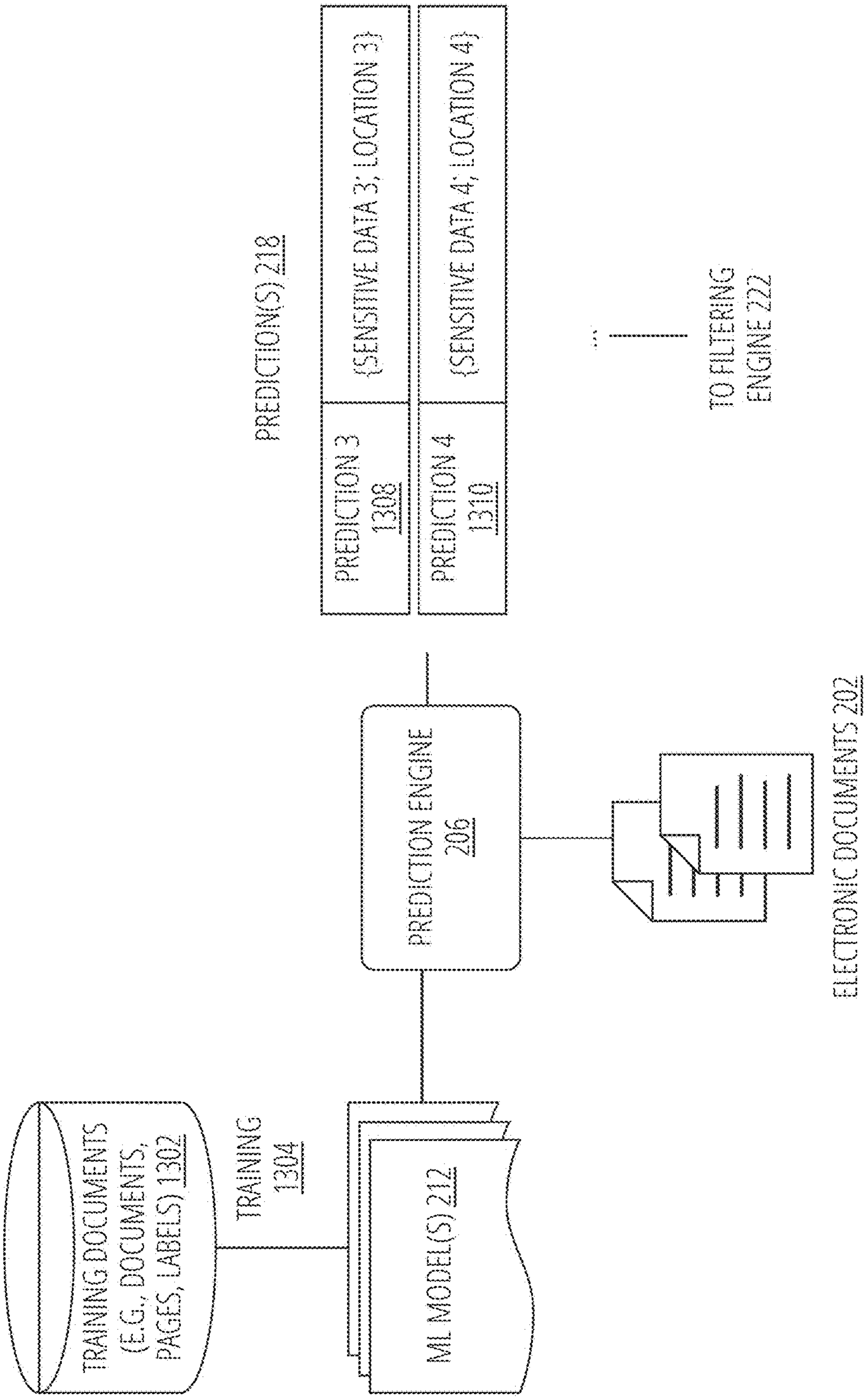
FIG. 13 illustrates operation of a prediction engine, according to some embodiments of the current subject matter.

FIG. 13 illustrates operation of the prediction engine 206, according to some embodiments of the current subject matter. The prediction engine 206 may be configured to analyze one or more electronic documents 202 using one or more ML model(s) 212 and generate one or more prediction (s) 218 that may include an identification of sensitive data and its location with a specific document and/or documents 202.

The ML model(s) 212, used by the engine 206, may be trained, at 1304, using one or more training documents (e.g., documents, pages, labels) 1302. Documents 1302 may be historical documents, portions of documents, sensitive data types, labels identifying sensitive data and/or location(s) thereof, locations of sensitive documents, document types, etc. Such documents may have been previously processed by the engine 150 (and/or any of its components) to generate one or more predictions related to existence of sensitive data within documents. The ML model(s) 212 may be used to detect sensitive data and/or its location in any of the documents 202, irrespective of the type of document and/or sensitive data being sought. Alternatively, or in addition, the ML model(s) 212 may be applied in accordance with one or more categories that may be related to specific type of documents, specific sensitive data, etc. For example, some models 212 may be applied to detect banking information (e.g., IBAN sequences, payment card information, etc.), others to detect demographic information (e.g., age, gender, religion, etc.), yet other models to detect personal identifiable information (e.g., name, address, social security number sequence, etc.), etc. As can be understood, any type of models 212 (e.g., machine learning models, large language models, generative AI models, etc.) may be used and/or applied, as desired, to any type of documents.

As shown in FIG. 13, the engine 206 may apply one or more ML model(s) 212 to generate one or more prediction(s) 218, which may, for example, include prediction 3 1308 and prediction 4 1310. The prediction 3 1308 may be configured to state "{SENSITIVE DATA 3; LOCATION 3}", where SENSITIVE DATA 3 may be an IBAN sequence in a financial services agreement and LOCATION 3 may correspond to page 10, paragraph 2, line 1 of the same agreement (alternatively, or in addition, one or more coordinates may be used). The prediction 4 1310 may be configured to state "{SENSITIVE DATA 4; LOCATION 4}", where SENSITIVE DATA 4 may be banking information (e.g., account and routing number) and LOCATION 4 may correspond to page 10, paragraph 2, line 2 of the same agreement. As can be understood, any other prediction(s) 218 may be outputted by the prediction engine 206.

Similar to the predictions 1 1202 and 1204, the prediction 3 1308 and prediction 4 1310 may be provided to the filtering engine 222, which may filter out some of the predictions based on an indication that some of the data should not be deemed sensitive. In this case, all data identified by the engine 206 may be deemed sensitive and thus, none of it may be filtered out. As can be understood, filtering categories may be based on various factors, such as, for example, whether identified data is publicly available, is not private, not commercial sensitive, not personal in nature, etc.

Figure 14:
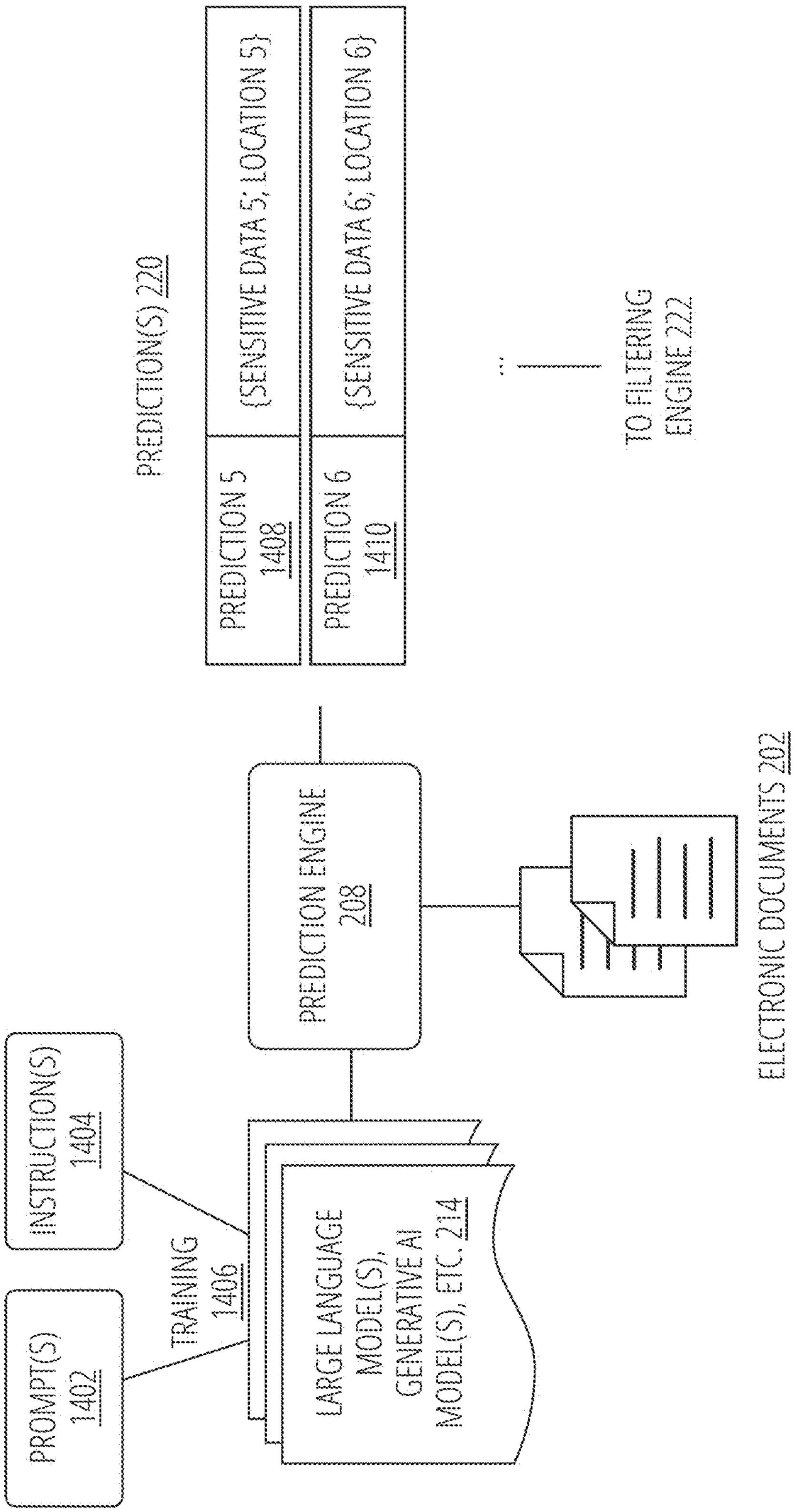
FIG. 14 illustrates operation of a prediction engine, according to some embodiments of the current subject matter.

FIG. 14 illustrates operation of the prediction engine 208, according to some embodiments of the current subject matter. The prediction engine 208 may be configured to analyze one or more electronic documents 202 using one or more large language model(s) 214 and generate one or more prediction(s) 220 that may include an identification of sensitive data and its location with a specific document and/or documents 202. As can be understood, the model(s) 214 may be any type of models, such as for example, machine learning models, large language models, generative AI models, etc.

The model(s) 214 may be part of the sensitive data detection engine 150 and/or be one or more third party models, including, but not limited to, any artificial intelligence generative models, e.g., GPT, Llama, Bard, Gemini, Claude, DBRX, Mixtral, etc., and may be accessed by the prediction engine 208. The large language model(s) 214 may be trained and/or fine-tuned using one or more prompt(s) 1402, instruction(s) 1404, etc., which may and/or may not be specific to identification of particular sensitive data and/or specific type of electronic document. For example, the large language model(s) 214 may be trained, fine-tuned, etc. to identify emails, names, etc., which may be present in electronic documents. Alternatively, or in addition, the large language model(s) 214 may be trained, fine-tuned, etc. to identify sensitive data in lease agreements, etc. For example, prompt(s) 1402 to the large language model(s) 214 may, for example, include: "Identify all email addresses and their locations in the document." An example instruction(s) 1404 may include: "Highlight sensitive data in the lease agreement and provide its location." As can be understood, any other type of prompt(s) 1402 and/or instruction(s) 1404 may be provided to the large language model(s) 214 either during training, fine tuning, etc., and/or during analysis of documents performed by the prediction engine 208.

The engine 208 may apply one or more generative AI model(s) 214 to detect sensitive data and/or its location in documents 202 (e.g., respective and/or irrespective of the type of document and/or sensitive data being sought). Alternatively, or in addition, similar to ML model(s) 212, the large language model(s) 214 may be applied in accordance with one or more categories that may be related to specific type of documents, specific sensitive data, etc., such as, for example, financial information (e.g., IBAN sequences, payment card information, etc.), demographic information (e.g., age, gender, religion, etc.), personal identifiable information (e.g., name, address, social security number sequence, etc.), etc.

The output of prediction engine 208 may include one or more prediction(s) 220 that may identify sensitive data and its location within the electronic documents 202 that has been presented to the large language model(s) 214. For example, the location of sensitive data (e.g., email address, etc.) may be identified using one or more coordinates, e.g., "(x1, y1), (x1, y2)", and/or in any other fashion.

As shown in FIG. 14, the engine 208 may apply one or more large language model(s) 214 to generate one or more prediction(s) 220, which may, for example, include prediction 5 1408 and prediction 6 1410. The prediction 5 1408 be configured to state "{SENSITIVE DATA 5; LOCATION 5}", where SENSITIVE DATA 5 may be date/time (e.g., date/time for making a payment under the terms of the financial service agreement) and LOCATION 5 may correspond to "(x1, y1), (x1, y2)" in the same document (alternatively, or in addition, page, paragraph, line, etc. identifications may be used). The prediction 6 1410 may be configured to state "{SENSITIVE DATA 6; LOCATION 6}", where SENSITIVE DATA 6 may be personal identifiable information in a financial services agreement (e.g., name, social security number sequence, etc.) and LOCATION 6 may correspond to "(x3, y3), (x4, y4)" in the same document (alternatively, or in addition, page, paragraph, line, etc. identifications may be used). As can be understood, any other prediction(s) 220 may be outputted by the prediction engine 208.

Similar to the predictions 1-4 above, the prediction 5 1408 and prediction 6 1410 may be provided to the filtering engine 222, which may filter out some of the predictions. Thus, the filtering engine 222 may exclude prediction 5 1408 from the prediction(s) 220 and only provide prediction 6 1410, as its prediction(s) 220. As can be understood, any type of filtering may be applied to prediction(s) 220.

Figure 15:
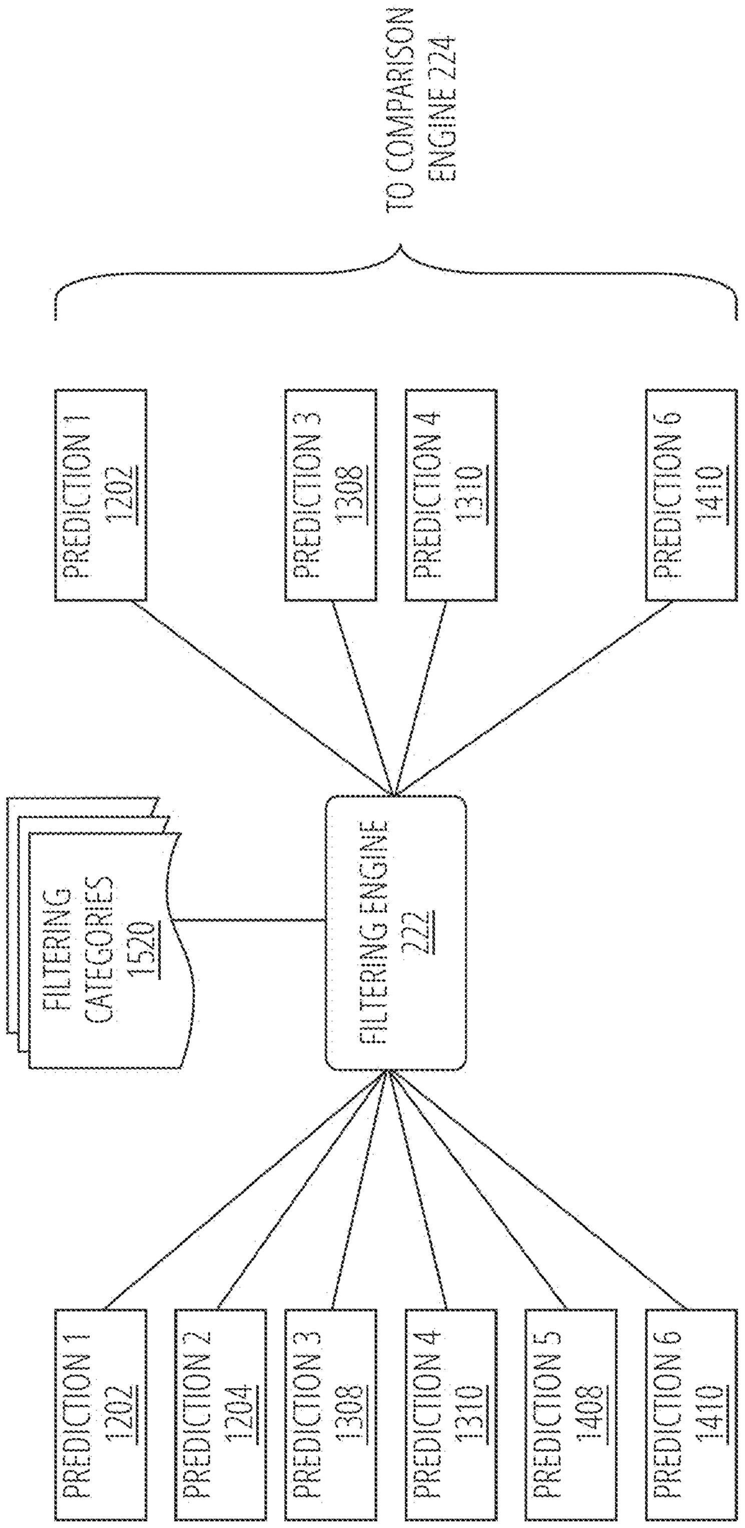
FIG. 15 illustrates operation of the filtering engine, according to some embodiments of the current subject matter.

FIG. 15 illustrates operation of the filtering engine 222, according to some embodiments of the current subject matter. The filtering engine 222 may be configured to analyze one or more predictions prediction(s) 216, 218, and/or 220 to determine whether any of the predictions should be filtered out from being processed by the comparison engine 224 and/or any of the final prediction(s) 226.

As discussed above, predictions 1202, 1204, 1308, 1310, 1408, and 1410, as generated by the respective prediction engine 204, 206, 208, may be provided to the filtering engine 222 for analysis. The filtering engine 222 may implement one or more filtering categories 1520 to determine which predictions should be filtered out. For example, the filtering categories may relate to exclusion of addresses, dates/times, etc. from some models/rules, and their inclusion from others. The categories 1520 of sensitive data may be predefined for the operation of filtering engine 222. These may depend on specific documents being analyzed by the engine 150, specific sensitive data being sought to be detected, and/or any other factors.

As shown in FIG. 15, and by way of a non-limiting example, using the categories 1520, the engine 222 may then processes the predictions generated by the engines 204-208 and exclude prediction 2 1204, which states "{123 MAIN STREET; LOCATION 2}", where 123 MAIN STREET may correspond to the address data having LOCATION 2 corresponding to where, in the document, this data may be found (e.g., first page, second line, and/or coordinates {(x3, y3), (x4, y4)}), and prediction 5 1408, which identifies date/time (e.g., date/time for making a payment under the terms of the financial service agreement) with its LOCATION 5 corresponding to "(x1, y1), (x1, y2)". The prediction 2 1204 may be excluded from the output of one prediction engine due to, for example, higher accuracy for the data address category by another prediction engine for example and/or due to other factors, and included in the filtering categories 1520. Similarly, prediction 5 1408 may be excluded from and/or included in the categories 1520.

The remaining predictions, i.e., prediction 1 1202, prediction 3 1308, prediction 4 1310, and prediction 6 1410, as shown in FIG. 15, may be provided to comparison engine 224 for comparison and subsequent determination of one or more final prediction(s) 226. Based on the comparison of predictions, the engine 224 may be configured to determine content of the final prediction(s) 226, which may include outputting all predictions (e.g., due to their non-overlapping nature and/or partially overlapping nature and/or one prediction including containing another prediction, etc.), outputting one prediction (e.g., due to predictions being the same, and/or one prediction containing another prediction, etc.), and/or generating any other output as prediction(s) 216.

FIG. 16 illustrates operation of the comparison engine 224, according to some embodiments of the current subject matter. The comparison engine 224 may be configured to analyze one or more predictions prediction(s) 216, 218, and/or 220, as for example, filtered by the filtering engine 222, to determine overlap among predictions and, then generate one or more final prediction(s) 226.

The overlaps may be determined for specific sensitive data (e.g., email addresses), locations of sensitive data (whether or not for the same sensitive data), portions of locations (e.g., partial coordinates, etc.), and/or any combinations thereof. By way of a non-limiting example, the comparison engine 224 may, upon comparing a prediction set 1 1602 (e.g., as related to emails), as generated by the prediction engine 204 and a prediction set 2 1604 (as related to names) as generated by the prediction engine 206 may determine that there is no overlap between the prediction sets, and hence it may generate comparison engine output 1622, which may include both prediction set 1 1602 and prediction set 2 1604. In some example, non-limiting embodiments, the prediction set 1 1602 and prediction set 2 1604 do not include any overlaps in the location data and/or the sensitive data, e.g., "(x1, y1), (x2, y2)" as for example predicted by prediction engine 204 and "(x3, y3), (x4, y4)" as predicted by prediction engine 206, and/or alternatively, or in addition, sensitive email data of "john.smith@company.com" as predicted by prediction engine 206 and sensitive payment card data of "1234 5678 9101 1213" as predicted by prediction engine 208, the comparison engine 224 may output all prediction sets.

In some embodiments, the comparison engine 224 may determine that there is some overlap between predicted locations of sensitive data. For instance, a prediction set 3 1606 may include location of sensitive data as "(x1, y1), (x2, y2)" as predicted by the prediction engine 204 and a prediction set 4 1608 may include location of sensitive data as "(x1, y1), (x3, y3)" as predicted by the prediction engine 206. The overlap may be in the location information defined by "(x1, y1)". As can be understood, the comparison engine 224 may also determine that there is an overlap between predictions generated by engines 204, 206 with predictions generated by engine 208, i.e., "(x1, y1), (x1, y2)". In this case, the overlap may be defined by "(x1, y1") as well as "x1", which may represent various coordinates of the sensitive data. In this case, the comparison engine 224 may determine that the comparison engine output 1622 should include both prediction sets 1606 and 1608.

In some embodiments, the overlaps may be defined by full overlaps (e.g., location data predicted by one engine entirely matches location data predicted by the other engine, and/or location data predicted by one engine includes entirety of location data predicted by the other engine), and/or partial overlaps (e.g., some location data predicted by one engine matches some location data predicted by the other engine). As shown in FIG. 16, prediction set 5 1610, e.g., as generated by prediction engine 204, may encompass and/or contain prediction set 6 1612, e.g., as generated by prediction engine 206. The comparison engine 224 may then determine to still output both prediction set 5 1610 and prediction set 6 1612, which may ensure that use of regular expressions do not inadvertently omit data that may be deemed sensitive (e.g., application of the ML model(s) 212 may be deemed to be overinclusive and identify more sensitive data (e.g., partial data that might not meet one or more regular expression rules 210 used by the prediction engine 204) and/or more locations of such data). Alternatively, or in addition, the comparison engine 224 may determine to output a single set of data when one of the prediction sets encompasses another. For instance, the comparison engine 224 may output prediction set 7 1614 if prediction set 7 1614 (e.g., generated by prediction engine 204) is determined to include prediction set 8 1616 (e.g., as generated by prediction engine 206). As can be understood, overlaps may be defined in any other desired way. Further, the above examples of prediction sets have been provided with regard to being generated by engines 204 and 206, the comparisons performed by the comparison engine 224 may be performed in a similar fashion among all predictions 216-220 as generated by the respective engines 204-208. The comparisons may be performed on filtered (as filtered by filtering engine 222) and/or unfiltered predictions.

Once the comparison is completed, the comparison engine 224 may be configured to generate one or more final prediction(s) 226. The final prediction(s) 226 may include any combination of the above prediction sets, as may be generated by the engines 204, 206, and/or 208, which may be determined based on presence and/or absence of overlaps in the predictions. Alternatively, or in addition, predictions by one engine (e.g., engine 208) may be deemed to be more accurate and/or more inclusive than other predictions (e.g., predictions by engines 204 and/or 206), and thus, may be outputted as final prediction(s) 226. As can be understood, predictions 226 may include any combination of predictions 216-220 and may be determined in any other desired fashion.

Figure 17:
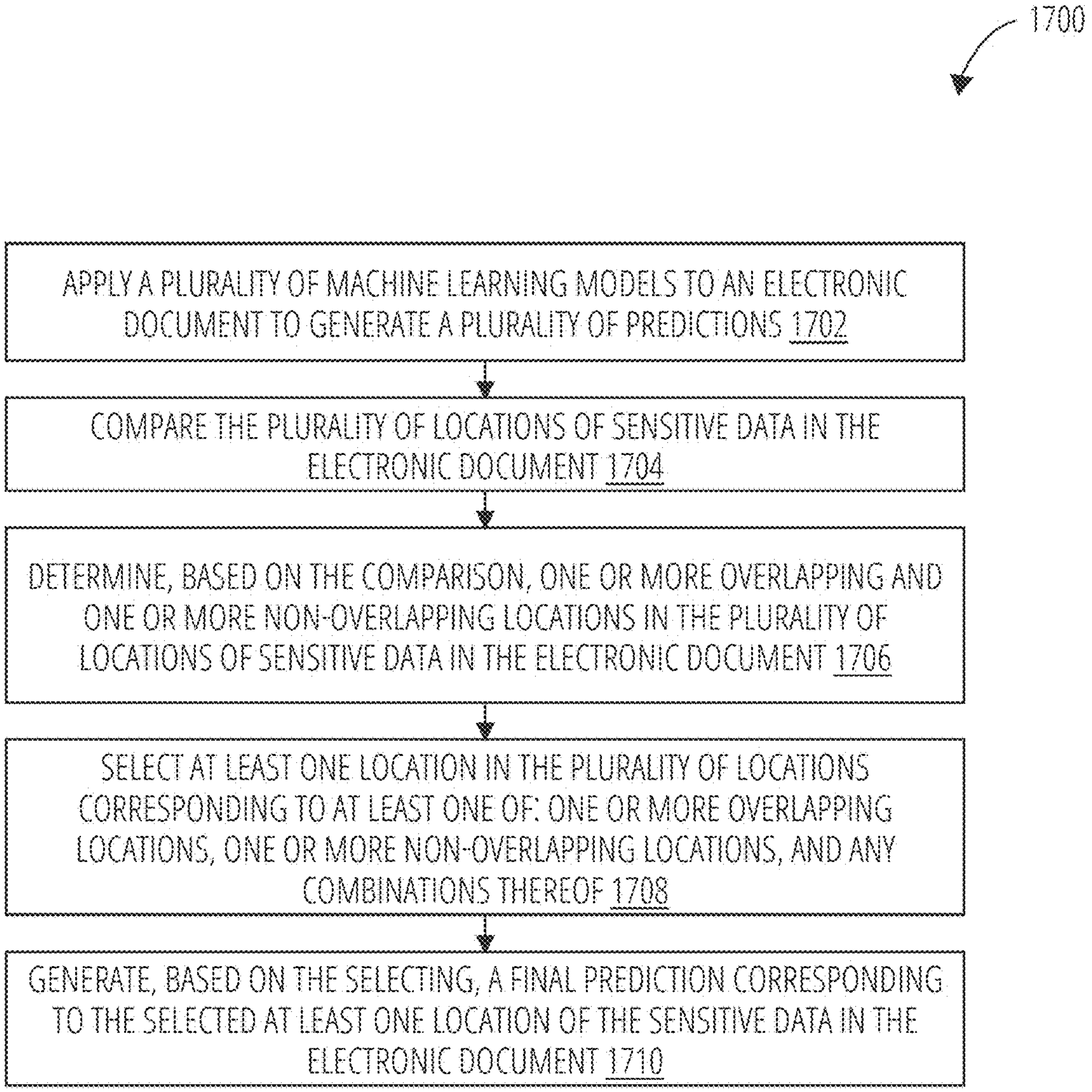
FIG. 17 illustrates an example method for identifying sensitive data, according to some embodiments of the current subject matter.

FIG. 17 illustrates an example method 1700 for identifying sensitive data, according to some embodiments of the current subject matter. The method 1700 may be executed using system 100 shown in FIG. 1, and in particular using the sensitive data detection engine 150.

At 1702, the sensitive data detection engine 150 may apply a plurality of machine learning models (e.g., models 210, 212, and/or 214) to an electronic document (e.g., one of the electronic documents 202) to generate a plurality of predictions (e.g., prediction(s) 216, 218, and/or 220, respectively). Each prediction may identify a location (e.g., first page, first paragraph, first line of a document) in a plurality of locations of sensitive data in the electronic document.

At 1704, the sensitive data detection engine 150, and in particular, its comparison engine 224, may compare the plurality of locations of sensitive data in the electronic document. The comparison engine 224, as discussed above, may be configured to determine whether overlaps among such locations may exist, as shown in FIG. 16.

At 1706, the engine 150 may determine, based on the comparison performed by the comparison engine 224, one or more overlapping (e.g., prediction set 3 1606 and prediction set 4 1608, etc., as shown in FIG. 16) and one or more non-overlapping locations (e.g., prediction set 1 1602 and prediction set 2 1604, as shown in FIG. 16) in the plurality of locations of sensitive data in the electronic document.

At 1708, the engine 150, and in particular the comparison engine 224, may select at least one location in the plurality of locations corresponding to at least one of: one or more overlapping locations, one or more non-overlapping locations, and any combinations thereof, and generate, at 1710, a final prediction (e.g., final prediction(s) 226) corresponding to the selected location of the sensitive data in the electronic document.

Figure 18:
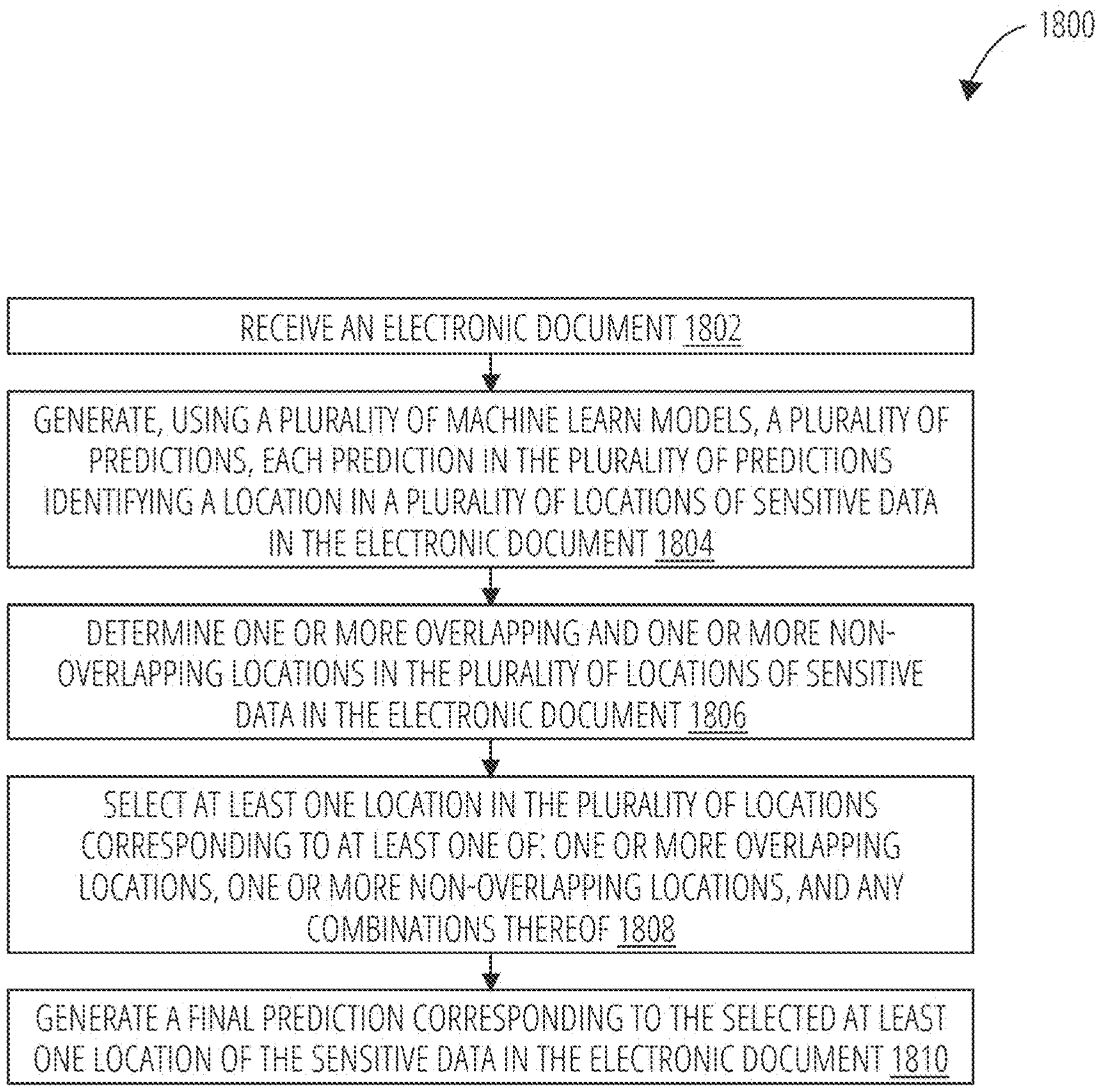
FIG. 18 illustrates another example method for identifying sensitive data, according to some embodiments of the current subject matter.

FIG. 18 illustrates another example method 1800 for identifying sensitive data, according to some embodiments of the current subject matter. The method 1800 may be executed using the sensitive data detection engine 150, as shown and discussed in connection with FIGS. 1-2.

At 1802, the sensitive data detection engine 150 may receive an electronic document (e.g., one or more electronic documents 202, and generate, using a plurality of machine learns models (e.g., models 210, 212, and/or 214), a plurality of predictions (e.g., prediction(s) 216, 218, 220, respectively). Each prediction may identify a location in a plurality of locations of sensitive data in the electronic document, at 1804.

At 1806, the sensitive data detection engine 150 may determine one or more overlapping and one or more non-overlapping locations in the plurality of locations of sensitive data in the electronic document. The overlapping locations may point to, for example, a common location of sensitive data. Non-overlapping locations point to locations and/or sensitive data that does not overlap with any other location and/or sensitive data either in the same document or in different documents.

At 1808, the engine 150 may select at least one location in the plurality of locations corresponding to at least one of: one or more overlapping locations, one or more non-overlapping locations, and any combinations thereof, and generate, at 1810, a final prediction (e.g., final prediction(s) 226) corresponding to the selected location of the sensitive data in the electronic document.

Figure 19:
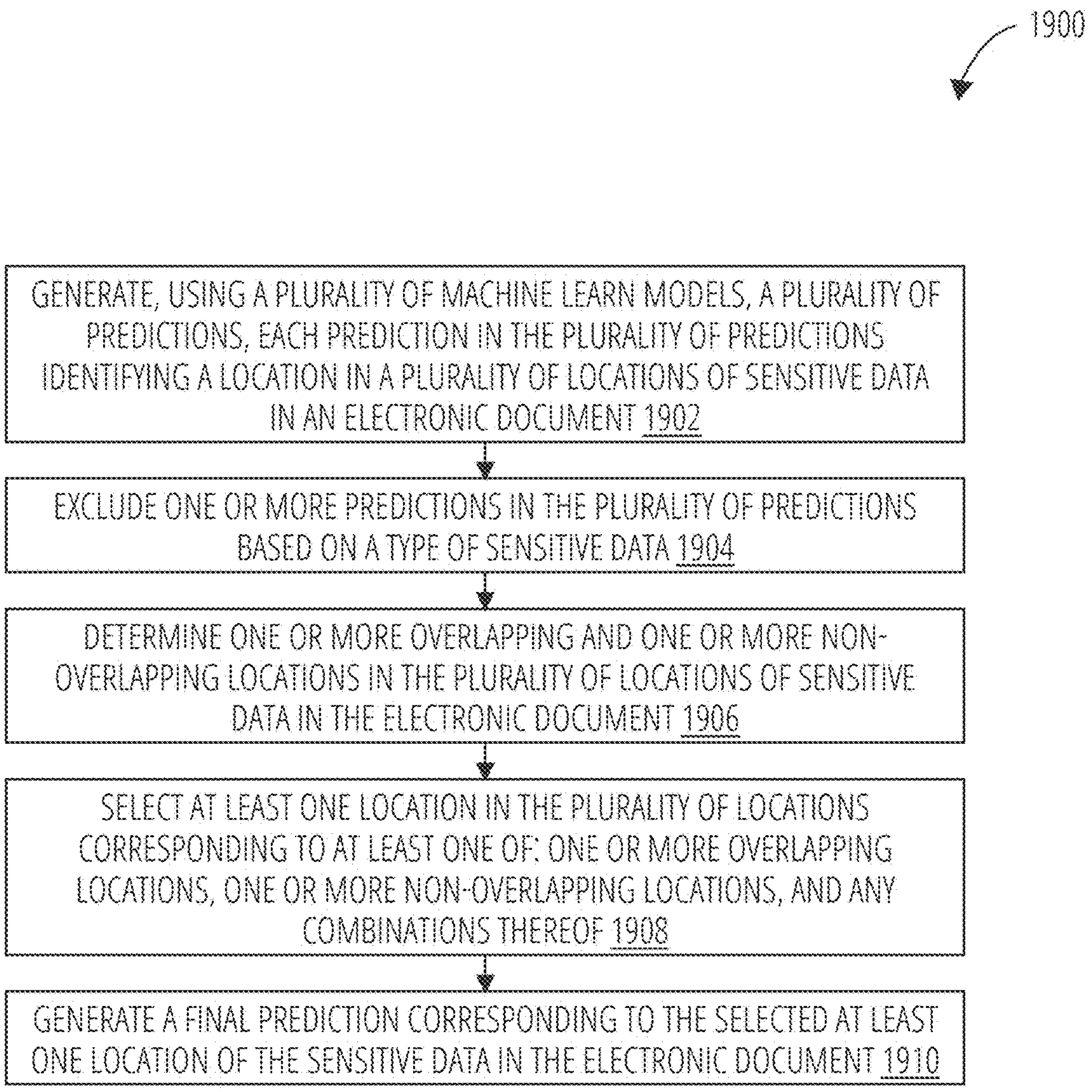
FIG. 19 illustrates yet another example method for identifying sensitive data, according to some embodiments of the current subject matter.

FIG. 19 illustrates yet another example method 1900 for identifying sensitive data, according to some embodiments of the current subject matter. Similarly, the method 1900 may be executed using the sensitive data detection engine 150, including its engines 204-208, 222, and/or 224.

At 1902, one or more of the engines 204-208 of the sensitive data detection engine 150 may generate, using a plurality of machine learns models (e.g., models 210, 212, 214, respectively), a plurality of predictions (e.g., prediction (s) 216, 218, 220, respectively). Each prediction may identify a location of sensitive data in an electronic document (e.g., electronic documents 202).

At 1904, the filtering engine 222 of the sensitive data detection engine 150 may exclude one or more predictions based on a type of sensitive data (e.g., filtering categories 1520, as shown in FIG. 15).

At 1906, the comparison engine 224 of the sensitive data detection engine 150 may determine one or more overlapping and one or more non-overlapping locations of sensitive data in the electronic document, and, at 1908, select at least one location corresponding to at least one of: one or more overlapping locations, one or more non-overlapping locations, and any combinations thereof. The comparison engine 224 may then generate a final prediction (e.g., final prediction(s) 226) corresponding to the selected location of the sensitive data in the electronic document, at 1910.

Figure 20:
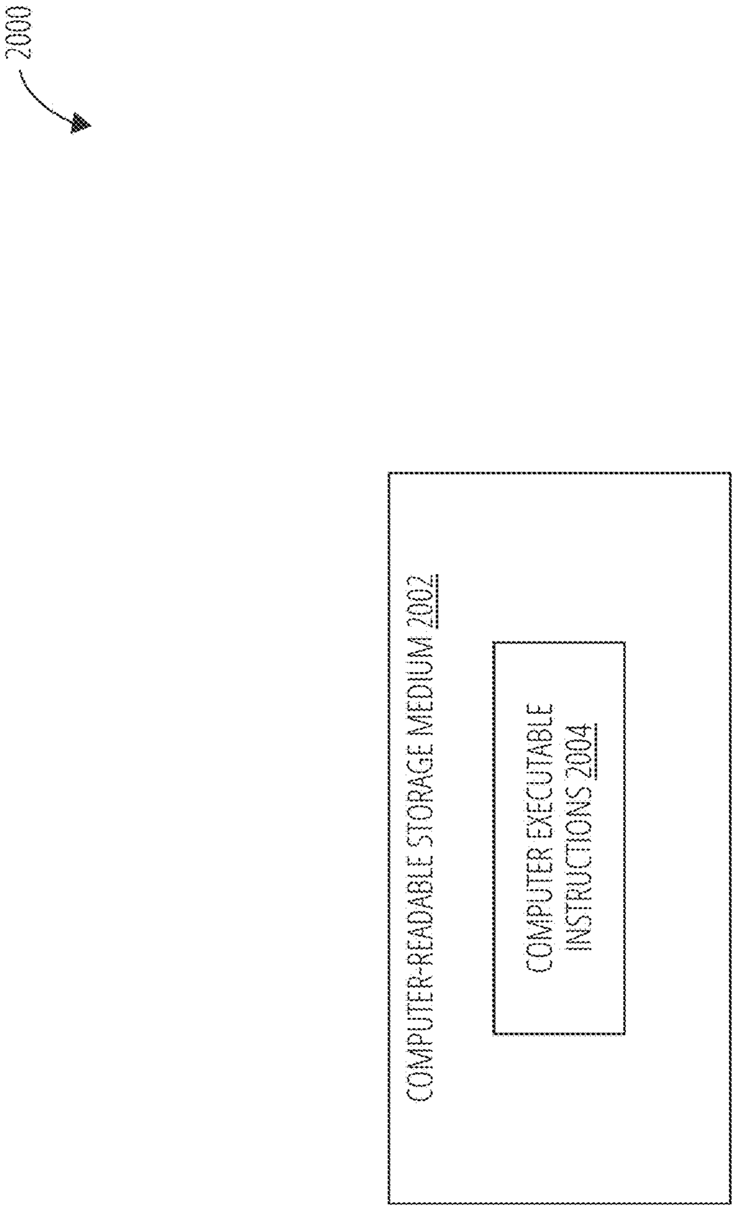
FIG. 20 illustrates a computer-readable storage medium in accordance with one embodiment.

FIG. 20 illustrates an apparatus 2000. Apparatus 2000 may comprise any non-transitory computer-readable storage medium 2002 or machine-readable storage medium, such as an optical, magnetic or semiconductor storage medium. In various embodiments, apparatus 2000 may comprise an article of manufacture or a product. In some embodiments, the computer-readable storage medium 2002 may store computer executable instructions with which circuitry can execute. For example, computer executable instructions 2004 can include instructions to implement operations described with respect to any logic flows described herein. Examples of computer-readable storage medium 2002 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 2004 may include any suitable type of code, such as source code, compiled code, interpreted code, executable code, static code, dynamic code, object-oriented code, visual code, and the like.

FIG. 21 illustrates an embodiment of a computing architecture 2100. Computing architecture 2100 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 2100 may have a single processor with one core or more than one processor. Note that the term "processor" refers to a processor with a single core or a processor package with multiple processor cores. In at least one embodiment, the computing architecture 2100 is representative of the components of the system 100. More generally, the computing architecture 2100 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 2100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 21, computing architecture 2100 comprises a system-on-chip (SoC) 2102 for mounting platform components. System-on-chip (SoC) 2102 is a point-to-point (P2P) interconnect platform that includes a first processor 2104 and a second processor 2106 coupled via a point-to-point interconnect 2170 such as an Ultra Path Interconnect (UPI). In other embodiments, the computing architecture 2100 may be of another bus architecture, such as a multi-drop bus. Furthermore, each of processor 2104 and processor 2106 may be processor packages with multiple processor cores including core(s) 2108 and core(s) 2110, respectively. While the computing architecture 2100 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 2104 and chipset 2132. Some platforms may include additional components and some platforms may only include sockets to mount the processors and/or the chipset. Furthermore, some platforms may not have sockets (e.g., SoC, or the like). Although depicted as a SoC 2102, one or more of the components of the SoC 2102 may also be included in a single die package, a multi-chip module (MCM), a multi-die package, a chiplet, a bridge, and/or an interposer. Therefore, embodiments are not limited to a SoC.

The processor 2104 and processor 2106 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 2104 and/or processor 2106. Additionally, the processor 2104 need not be identical to processor 2106.

Processor 2104 includes an integrated memory controller (IMC) 2120 and point-to-point (P2P) interface 2124 and P2P interface 2128. Similarly, the processor 2106 includes an IMC 2122 as well as P2P interface 2126 and P2P interface 2130. IMC 2120 and IMC 2122 couple the processor 2104 and processor 2106, respectively, to respective memories (e.g., memory 2116 and memory 2118). Memory 2116 and memory 2118 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 2116 and the memory 2118 locally attach to the respective processors (i.e., processor 2104 and processor 2106). In other embodiments, the main memory may couple with the processors via a bus and shared memory hub. Processor 2104 includes registers 2112 and processor 2106 includes registers 2114.

Computing architecture 2100 includes chipset 2132 coupled to processor 2104 and processor 2106. Furthermore, chipset 2132 can be coupled to storage device 2150, for example, via an interface (I/F) 2138. The I/F 2138 may be, for example, a Peripheral Component Interconnect-enhanced (PCIe) interface, a Compute Express Link® (CXL) interface, or a Universal Chiplet Interconnect Express (UCIe) interface. Storage device 2150 can store instructions executable by circuitry of computing architecture 2100 (e.g., processor 2104, processor 2106, GPU 2148, accelerator 2154, vision processing unit 2156, or the like). For example, storage device 2150 can store instructions for server device 102, client devices 112, client devices 116, or the like.

Processor 2104 couples to the chipset 2132 via P2P interface 2128 and P2P 2134 while processor 2106 couples to the chipset 2132 via P2P interface 2130 and P2P 2136. Direct media interface (DMI) 2176 and DMI 2178 may couple the P2P interface 2128 and the P2P 2134 and the P2P interface 2130 and P2P 2136, respectively. DMI 2176 and DMI 2178 may be a high-speed interconnect that facilitates, e.g., eight Giga Transfers per second (GT/s) such as DMI 3.0. In other embodiments, the processor 2104 and processor 2106 may interconnect via a bus.

The chipset 2132 may comprise a controller hub such as a platform controller hub (PCH). The chipset 2132 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 2132 may comprise more than one controller hub such as a chipset with a memory controller hub, a graphics controller hub, and an input/output (I/O) controller hub.

In the depicted example, chipset 2132 couples with a trusted platform module (TPM) 2144 and UEFI, BIOS, FLASH circuitry 2146 via I/F 2142. The TPM 2144 is a dedicated microcontroller designed to secure hardware by integrating cryptographic keys into devices. The UEFI, BIOS, FLASH circuitry 2146 may provide pre-boot code. The I/F 2142 may also be coupled to a network interface circuit (NIC) 2180 for connections off-chip.

Furthermore, chipset 2132 includes the I/F 2138 to couple chipset 2132 with a high-performance graphics engine, such as, graphics processing circuitry or a graphics processing unit (GPU) 2148. In other embodiments, the computing architecture 2100 may include a flexible display interface (FDI) (not shown) between the processor 2104 and/or the processor 2106 and the chipset 2132. The FDI interconnects a graphics processor core in one or more of processor 2104 and/or processor 2106 with the chipset 2132.

The computing architecture 2100 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 2154 and/or vision processing unit 2156 can be coupled to chipset 2132 via I/F 2138. The accelerator 2154 is representative of any type of accelerator device (e.g., a data streaming accelerator, cryptographic accelerator, cryptographic co-processor, an offload engine, etc.). One example of an accelerator 2154 is the Intel® Data Streaming Accelerator (DSA). The accelerator 2154 may be a device including circuitry to accelerate copy operations, data encryption, hash value computation, data comparison operations (including comparison of data in memory 2116 and/or memory 2118), and/or data compression. For example, the accelerator 2154 may be a USB device, PCI device, PCIe device, CXL device, UCIe device, and/or an SPI device. The accelerator 2154 can also include circuitry arranged to execute machine learning (ML) related operations (e.g., training, inference, etc.) for ML models. Generally, the accelerator 2154 may be specially designed to perform computationally intensive operations, such as hash value computations, comparison operations, cryptographic operations, and/or compression operations, in a manner that is more efficient than when performed by the processor 2104 or processor 2106. Because the load of the computing architecture 2100 may include hash value computations, comparison operations, cryptographic operations, and/or compression operations, the accelerator 2154 can greatly increase performance of the computing architecture 2100 for these operations.

The accelerator 2154 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 2154. For example, the accelerator 2154 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 2154 via a non-posted write (e.g., a deferred memory write (DMWr)). One example of an instruction that atomically submits a work descriptor to the shared work queue of the accelerator 2154 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 2154. The dedicated work queue may accept job submissions via commands such as the movdir64b instruction.

Various I/O devices 2160 and display 2152 couple to the bus 2172, along with a bus bridge 2158 which couples the bus 2172 to a second bus 2174 and an I/F 2140 that connects the bus 2172 with the chipset 2132. In one embodiment, the second bus 2174 may be a low pin count (LPC) bus. Various devices may couple to the second bus 2174 including, for example, a keyboard 2162, a mouse 2164 and communication devices 2166.

Furthermore, an audio I/O 2168 may couple to second bus 2174. Many of the I/O devices 2160 and communication devices 2166 may reside on the system-on-chip (SoC) 2102 while the keyboard 2162 and the mouse 2164 may be add-on peripherals. In other embodiments, some or all the I/O devices 2160 and communication devices 2166 are add-on peripherals and do not reside on the system-on-chip (SoC) 2102.

FIG. 22 illustrates a block diagram of an exemplary communications architecture 2200 suitable for implementing various embodiments as previously described. The communications architecture 2200 includes various common communications elements, such as a transmitter, receiver, transceiver, radio, network interface, baseband processor, antenna, amplifiers, filters, power supplies, and so forth. The embodiments, however, are not limited to implementation by the communications architecture 2200.

As shown in FIG. 22, the communications architecture 2200 includes one or more clients 2202 and servers 2204. The clients 2202 may implement a client version of the server device 102, for example. The servers 2204 may implement a server version of the server device 102, for example. The clients 2202 and the servers 2204 are operatively connected to one or more respective client data stores 2208 and server data stores 2210 that can be employed to store information local to the respective clients 2202 and servers 2204, such as cookies and/or associated contextual information.

The clients 2202 and the servers 2204 may communicate information between each other using a communication framework 2206. The communications communication framework 2206 may implement any well-known communications techniques and protocols. The communications communication framework 2206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

(117) The communication framework 2206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2202 and the servers 2204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-20 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

The following examples pertain to further embodiments, from which numerous permutations and configurations will be apparent.

In one aspect, a computer-implemented method may include applying, using at least one processor, a plurality of machine learning models to an electronic document to generate a plurality of predictions, each prediction in the plurality of predictions identifying a location in a plurality of locations of sensitive data in the electronic document; comparing, using the at least one processor, the plurality of locations of sensitive data in the electronic document; determining, using the at least one processor, based on the comparing, one or more overlapping and one or more non-overlapping locations in the plurality of locations of sensitive data in the electronic document; selecting, using the at least one processor, at least one location in the plurality of locations corresponding to at least one of: the one or more overlapping locations, the one or more non-overlapping locations, and any combinations thereof; and generating, using the at least one processor, based on the selecting, a final prediction corresponding to the selected at least one location of the sensitive data in the electronic document.

The method may also include wherein the plurality of machine learning models includes at least one of the following: a regular expressions model, a trained machine learning model, a generative artificial intelligence model, and any combination thereof.

The method may also include wherein the one or more overlapping locations include one or more same locations in the plurality of locations of the sensitive data in the electronic document identified by at least two machine learning models in the plurality of machine learning models.

The method may also include wherein the one or more non-overlapping locations include one or more different locations in the plurality of locations of the sensitive data in the electronic document identified by at least two machine learning models in the plurality of machine learning models.

The method may also include wherein, upon the at least one selected location corresponding to the one or more non-overlapping locations, the final prediction includes one or more first locations of sensitive data in the electronic document identified by a first machine learning model in the plurality of machine learning models and one or more second locations of sensitive data in the electronic document identified by a second machine learning model in the plurality of machine learning models.

The method may also include wherein, upon the at least one selected location corresponding to the one or more overlapping locations, the final prediction includes at least one of the following: one or more first locations of sensitive data in the electronic document identified by a first machine learning model in the plurality of machine learning models, one or more second locations of the sensitive data in the electronic document identified by a second machine learning model in the plurality of machine learning models, the one or more first locations that include the one or more second locations, and any combination thereof.

The method may also include excluding one or more predictions in the plurality of predictions based on a type of sensitive data.

The method may also include wherein at least one machine learning model in the plurality of machine learning models is trained using historical sensitive data.

The method may also include wherein the sensitive data includes at least one of: a personal identifiable data or information, a commercially sensitive data or information, a trade secret data or information, a secret data or information, a non-public data or information, and any combination thereof.

In one aspect, a system may include at least one processor; and at least one non-transitory storage media storing instructions, that when executed by the at least one processor, cause the at least one processor to: receive an electronic document; generate, using a plurality of machine learning models, a plurality of predictions, each prediction in the plurality of predictions identifying a location in a plurality of locations of sensitive data in the electronic document; determine one or more overlapping and one or more non-overlapping locations in the plurality of locations of sensitive data in the electronic document; select at least one location in the plurality of locations corresponding to at least one of: the one or more overlapping locations, the one or more non-overlapping locations, and any combinations thereof; and generate a final prediction corresponding to the selected at least one location of the sensitive data in the electronic document.

The system may also include wherein the determination of the one or more overlapping and the one or more non-overlapping locations in the plurality of locations of sensitive data in the electronic document includes comparing the plurality of locations of sensitive data in the electronic document.

The system may also include wherein the plurality of machine learning models includes at least one of the following: a regular expressions model, a trained machine learning model, a generative artificial intelligence model, and any combination thereof.

The system may also include wherein the one or more overlapping locations include one or more same locations in the plurality of locations of the sensitive data in the electronic document identified by at least two machine learning models in the plurality of machine learning models.

The system may also include wherein the one or more non-overlapping locations include one or more different locations in the plurality of locations of the sensitive data in the electronic document identified by at least two machine learning models in the plurality of machine learning models.

The system may also include wherein, upon the at least one selected location corresponding to the one or more non-overlapping locations, the final prediction includes one or more first locations of sensitive data in the electronic document identified by a first machine learning model in the plurality of machine learning models and one or more second locations of sensitive data in the electronic document identified by a second machine learning model in the plurality of machine learning models.

The system may also include wherein, upon the at least one selected location corresponding to the one or more overlapping locations, the final prediction includes at least one of the following: one or more first locations of sensitive data in the electronic document identified by a first machine learning model in the plurality of machine learning models, one or more second locations of the sensitive data in the electronic document identified by a second machine learning model in the plurality of machine learning models, the one or more first locations that include the one or more second locations, and any combination thereof.

The system may also include wherein the processor may be configured to exclude one or more predictions in the plurality of predictions based on a type of sensitive data.

In one aspect, a non-transitory computer-readable storage medium, the computer-readable storage medium including instructions that when executed by at least one processor, cause the at least one processor to: generate, using a plurality of machine learning models, a plurality of predictions, each prediction in the plurality of predictions identifying a location in a plurality of locations of sensitive data in an electronic document; exclude one or more predictions in the plurality of predictions based on a type of sensitive data; determine one or more overlapping and one or more non-overlapping locations in the plurality of locations of sensitive data in the electronic document; select at least one location in the plurality of locations corresponding to at least one of: the one or more overlapping locations, the one or more non-overlapping locations, and any combinations thereof; and generate a final prediction corresponding to the selected at least one location of the sensitive data in the electronic document.

The non-transitory computer-readable storage medium may also include wherein at least one machine learning model in the plurality of machine learning models is trained using historical sensitive data.

The non-transitory computer-readable storage medium may also include wherein the sensitive data includes at least one of: a personal identifiable data or information, a commercially sensitive data or information, a trade secret data or information, a secret data or information, a non-public data or information, and any combination thereof.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:

applying, using at least one processor, a plurality of machine learning models to an electronic document to generate a plurality of predictions, each prediction in the plurality of predictions identifying a location in a plurality of locations of sensitive data in the electronic document;

comparing, using the at least one processor, the plurality of locations of sensitive data in the electronic document;

determining, using the at least one processor, based on the comparing, one or more overlapping and one or more non-overlapping locations in the plurality of locations of sensitive data in the electronic document;

selecting, using the at least one processor, at least one location in the plurality of locations corresponding to at least one of: the one or more overlapping locations, the one or more non-overlapping locations, and any combinations thereof; and generating, using the at least one processor, based on the selecting, a final prediction corresponding to the selected at least one location of the sensitive data in the electronic document.

2. The method of claim 1, wherein the plurality of machine learning models includes at least one of the following: a regular expressions model, a trained machine learning model, a large language model, a generative artificial intelligence model, and any combination thereof.

3. The method of claim 2, wherein the one or more overlapping locations include one or more same locations in the plurality of locations of the sensitive data in the electronic document identified by at least two machine learning models in the plurality of machine learning models.

4. The method of claim 2, wherein the one or more non-overlapping locations include one or more different locations in the plurality of locations of the sensitive data in the electronic document identified by at least two machine learning models in the plurality of machine learning models.

5. The method of claim 1, wherein, upon the at least one selected location corresponding to the one or more non-overlapping locations, the final prediction includes one or more first locations of sensitive data in the electronic document identified by a first machine learning model in the plurality of machine learning models and one or more second locations of sensitive data in the electronic document identified by a second machine learning model in the plurality of machine learning models.

6. The method of claim 1, wherein, upon the at least one selected location corresponding to the one or more overlapping locations, the final prediction includes at least one of the following:

one or more first locations of sensitive data in the electronic document identified by a first machine learning model in the plurality of machine learning models, one or more second locations of the sensitive data in the electronic document identified by a second machine learning model in the plurality of machine learning models, the one or more first locations that include the one or more second locations, and any combination thereof.

7. The method of claim 1, further comprising excluding one or more predictions in the plurality of predictions based on a type of sensitive data.

8. The method of claim 1, wherein at least one machine learning model in the plurality of machine learning models is trained using historical sensitive data.

9. The method of claim 1, wherein the sensitive data includes at least one of: a personal identifiable data or information, a commercially sensitive data or information, a trade secret data or information, a secret data or information, a non-public data or information, and any combination thereof.

10. A system, comprising:

at least one processor; and at least one non-transitory storage media storing instructions, that when executed by the at least one processor, cause the at least one processor to:

receive an electronic document;

generate, using a plurality of machine learning models, a plurality of predictions, each prediction in the plurality of predictions identifying a location in a plurality of locations of sensitive data in the electronic document;

determine one or more overlapping and one or more non-overlapping locations in the plurality of locations of sensitive data in the electronic document;

select at least one location in the plurality of locations corresponding to at least one of: the one or more overlapping locations, the one or more non-overlapping locations, and any combinations thereof; and generate a final prediction corresponding to the selected at least one location of the sensitive data in the electronic document.

11. The system of claim 10, wherein the determination of the one or more overlapping and the one or more non-overlapping locations in the plurality of locations of sensitive data in the electronic document includes comparing the plurality of locations of sensitive data in the electronic document.

12. The system of claim 10, wherein the plurality of machine learning models includes at least one of the following: a regular expressions model, a trained machine learning model, a large language model, a generative artificial intelligence model, and any combination thereof.

13. The system of claim 12, wherein the one or more overlapping locations include one or more same locations in the plurality of locations of the sensitive data in the electronic document identified by at least two machine learning models in the plurality of machine learning models.

14. The system of claim 12, wherein the one or more non-overlapping locations include one or more different locations in the plurality of locations of the sensitive data in the electronic document identified by at least two machine learning models in the plurality of machine learning models.

15. The system of claim 10, wherein, upon the at least one selected location corresponding to the one or more non-overlapping locations, the final prediction includes one or more first locations of sensitive data in the electronic document identified by a first machine learning model in the plurality of machine learning models and one or more second locations of sensitive data in the electronic document identified by a second machine learning model in the plurality of machine learning models.

16. The system of claim 10, wherein, upon the at least one selected location corresponding to the one or more overlapping locations, the final prediction includes at least one of the following:

one or more first locations of sensitive data in the electronic document identified by a first machine learning model in the plurality of machine learning models, one or more second locations of the sensitive data in the electronic document identified by a second machine learning model in the plurality of machine learning models, the one or more first locations that include the one or more second locations, and any combination thereof.

17. The system of claim 10, wherein the at least one processor is configured to exclude one or more predictions in the plurality of predictions based on a type of sensitive data.

18. A non-transitory computer-readable storage medium, the computer-readable storage medium including instructions that when executed by at least one processor, cause the at least one processor to generate, using a plurality of machine learning models, a plurality of predictions, each prediction in the plurality of predictions identifying a location in a plurality of locations of sensitive data in an electronic document;

exclude one or more predictions in the plurality of predictions based on a type of sensitive data;

determine one or more overlapping and one or more non-overlapping locations in the plurality of locations of sensitive data in the electronic document;

select at least one location in the plurality of locations corresponding to at least one of: the one or more overlapping locations, the one or more non-overlapping locations, and any combinations thereof; and generate a final prediction corresponding to the selected at least one location of the sensitive data in the electronic document.

19. The non-transitory computer-readable storage medium of claim 18, wherein at least one machine learning model in the plurality of machine learning models is trained using historical sensitive data.

20. The non-transitory computer-readable storage medium of claim 18, wherein the sensitive data includes at least one of: a personal identifiable data or information, a commercially sensitive data or information, a trade secret data or information, a secret data or information, a non-public data or information, and any combination thereof.

* * * * *